(12) United States Patent
White et al.

(10) Patent No.: US 8,096,391 B2
(45) Date of Patent: Jan. 17, 2012

(54) FORK WITH INTEGRATED BRAKING SYSTEM

(76) Inventors: Philip White, Toronto (CA); Rodney Mathew Chan, Mississauga (CA); John Schmider, Toronto (CA)

( * ) Notice: Subject to any disclaimer, the term of this patent is extended or adjusted under 35 U.S.C. 154(b) by 1195 days.

(21) Appl. No.: 11/889,203

(22) Filed: Aug. 9, 2007

(65) Prior Publication Data
US 2008/0035431 A1 Feb. 14, 2008

Related U.S. Application Data

(60) Provisional application No. 60/836,685, filed on Aug. 10, 2006.

(51) Int. Cl.
*B62L 3/00* (2006.01)
(52) U.S. Cl. .................... 188/24.12; 280/288.4
(58) Field of Classification Search ............... 188/24.12, 188/24.13; 280/288.4, 279, 280
See application file for complete search history.

(56) References Cited

U.S. PATENT DOCUMENTS

| 735,113 | A | 8/1903 | Kelland et al. |
|---|---|---|---|
| 2,460,204 | A | 1/1949 | Vacher |
| 3,160,181 | A | 12/1964 | Voyce et al. |
| 3,554,334 | A | 1/1971 | Shimano et al. |
| 3,993,174 | A | 11/1976 | Williams et al. |
| 4,008,903 | A | 2/1977 | Ramond |
| 4,136,759 | A | 1/1979 | Schoch |
| 4,163,481 | A | 8/1979 | Schoch |
| 4,290,506 | A | 9/1981 | Nagano et al. |
| D269,687 | S | 7/1983 | Nakao et al. |
| 4,552,251 | A | 11/1985 | Schoch |
| 4,611,690 | A | 9/1986 | Schoch |
| 4,754,853 | A | 7/1988 | Nagano |
| 4,765,433 | A | 8/1988 | Fujii et al. |
| 4,793,444 | A | 12/1988 | Nagano |
| 4,869,351 | A | 9/1989 | Romano |
| 4,941,674 | A | 7/1990 | Trimble |
| 4,969,539 | A | 11/1990 | Ishibashi |
| 5,016,895 | A | 5/1991 | Hollingsworth |
| 5,099,958 | A | 3/1992 | D'Aluisio |
| 5,228,542 | A | 7/1993 | Mack |
| 5,293,965 | A | 3/1994 | Nagano |
| 5,299,664 | A | 4/1994 | Peters |
| 5,531,296 | A | 7/1996 | Liu |
| 5,533,599 | A | 7/1996 | Sule |
| 5,615,753 | A | 4/1997 | Wang |
| 5,626,209 | A | 5/1997 | Viola |
| 5,803,207 | A | 9/1998 | Nielsen |
| 5,913,388 | A | 6/1999 | Ota et al. |
| 6,186,529 | B1 * | 2/2001 | Fujii ........................... 280/281.1 |
| 6,308,806 | B1 | 10/2001 | Nielsen |
| 6,325,401 | B1 | 12/2001 | Fujii |
| 6,899,202 | B1 | 5/2005 | McIntyre |
| 7,210,694 | B2 | 5/2007 | Trenne |
| 7,775,331 | B1 * | 8/2010 | Felt et al. ................... 188/24.12 |
| 7,837,212 | B2 * | 11/2010 | D'Aluisio ................ 280/281.1 |
| 7,946,395 | B1 * | 5/2011 | Tsai ........................... 188/24.22 |
| 7,946,605 | B2 * | 5/2011 | Lane ........................... 280/288.4 |
| 2002/0014756 | A1 | 2/2002 | Fujii |
| 2006/0061057 | A1 | 3/2006 | Trenne |
| 2007/0068744 | A1 | 3/2007 | Tsai |
| 2011/0181015 | A1 * | 7/2011 | Bell et al. ...................... 280/279 |

FOREIGN PATENT DOCUMENTS

DE 3310152 10/1984
(Continued)

*Primary Examiner* — Bradley King

(57) ABSTRACT

A cycle with a wheel-supporting structure comprising a crown section and a pair of forklegs, a brake assembly with lever arms mounted at least partially within cavity openings within each fork leg to reduce aerodynamic drag.

19 Claims, 17 Drawing Sheets

FOREIGN PATENT DOCUMENTS

| | | |
|---|---|---|
| DE | 3320532 | 12/1984 |
| DE | 3631299 | 3/1988 |
| DE | 19929678 | 11/2001 |
| EP | 0575720 | 12/1993 |
| EP | 1518786 | 3/2005 |
| FR | 2304508 | 10/1976 |
| SU | 1770206 | 10/1992 |

* cited by examiner

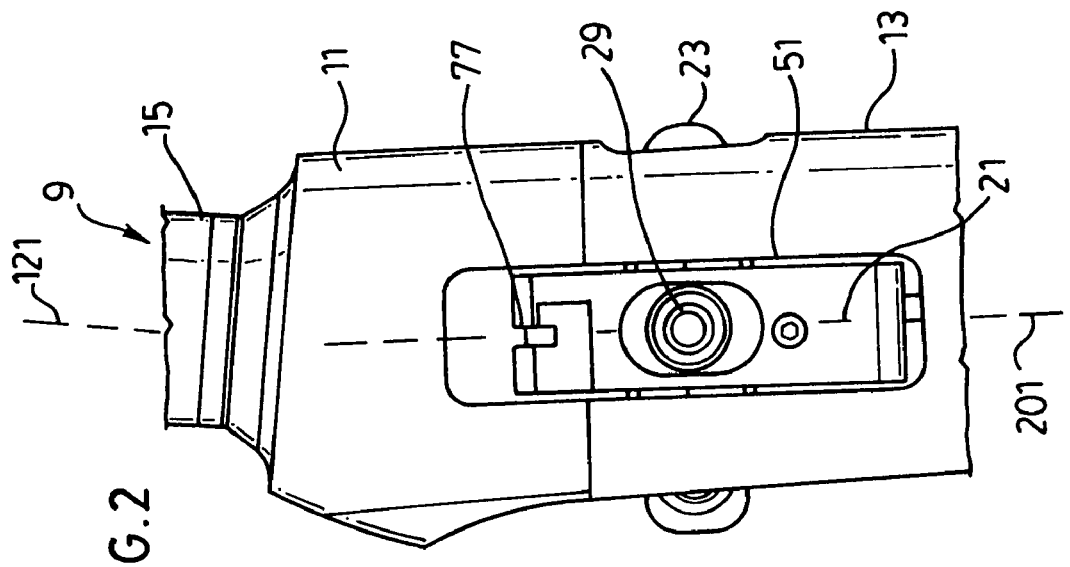
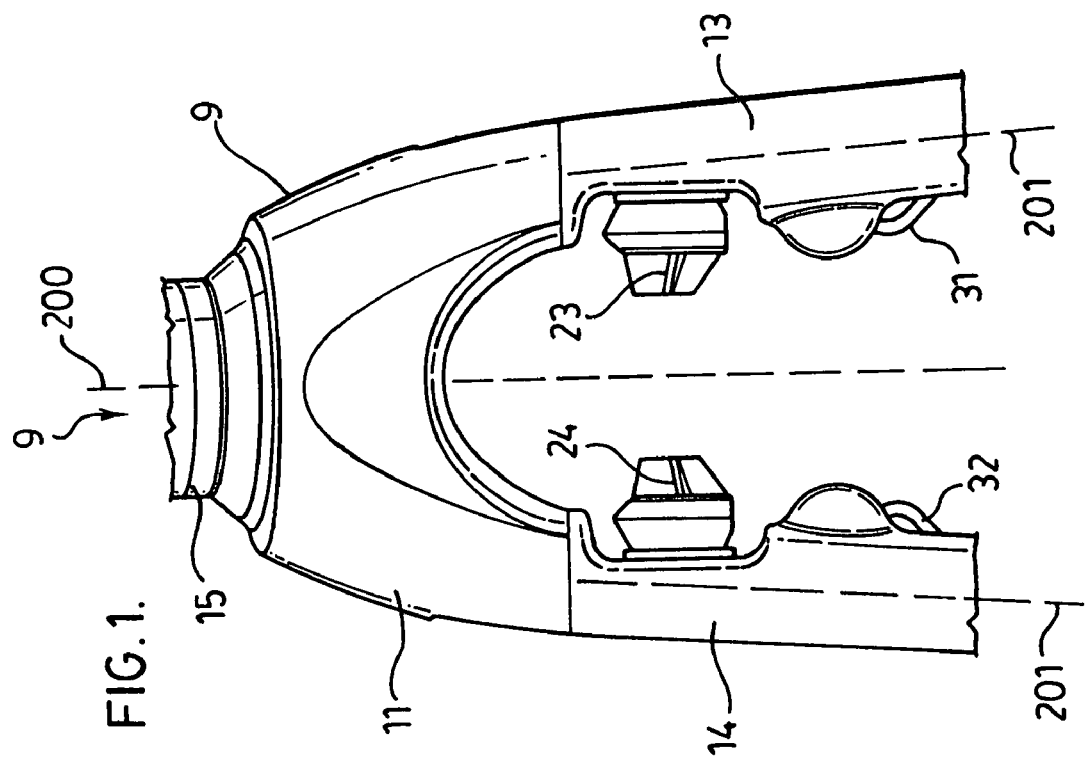

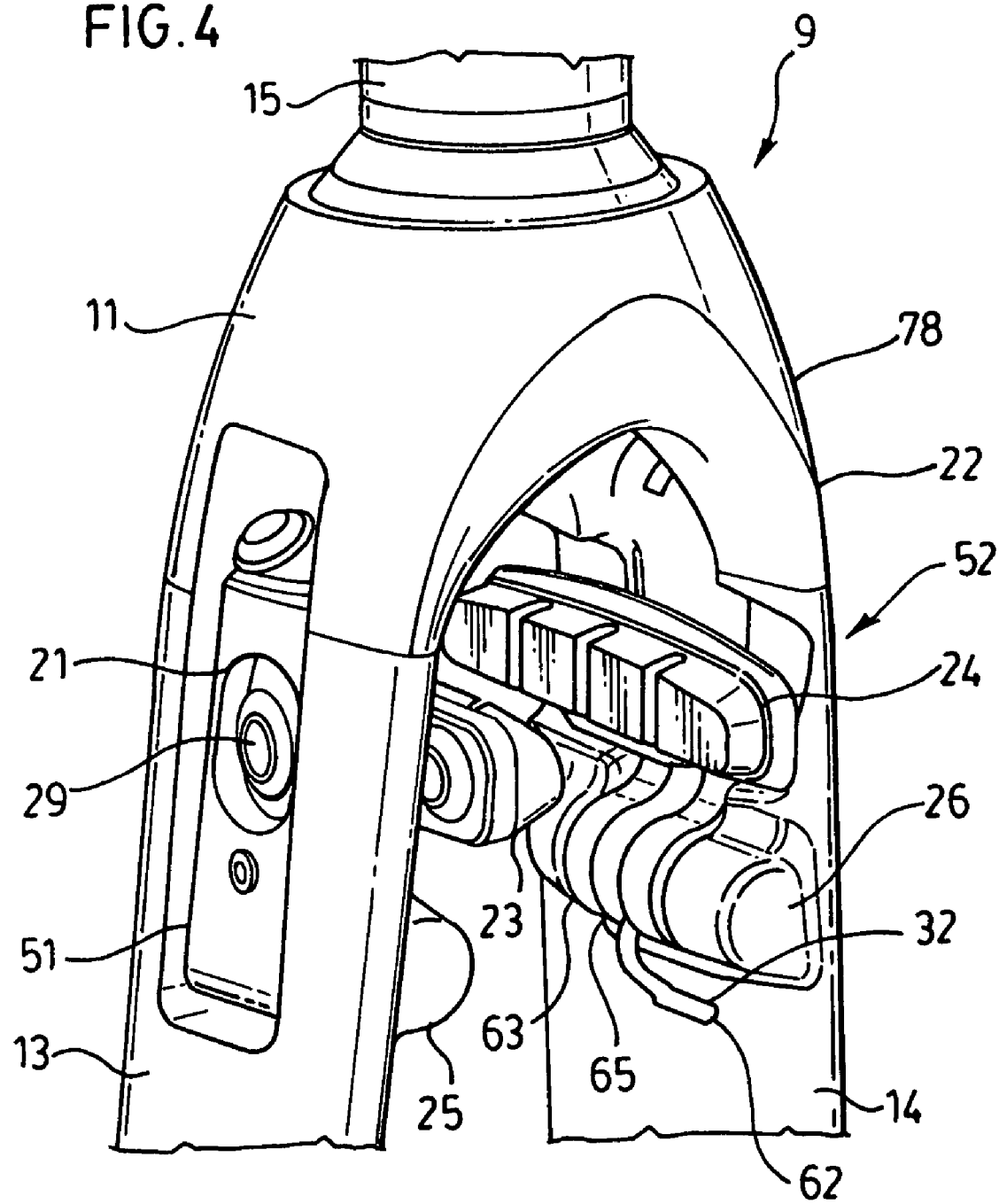

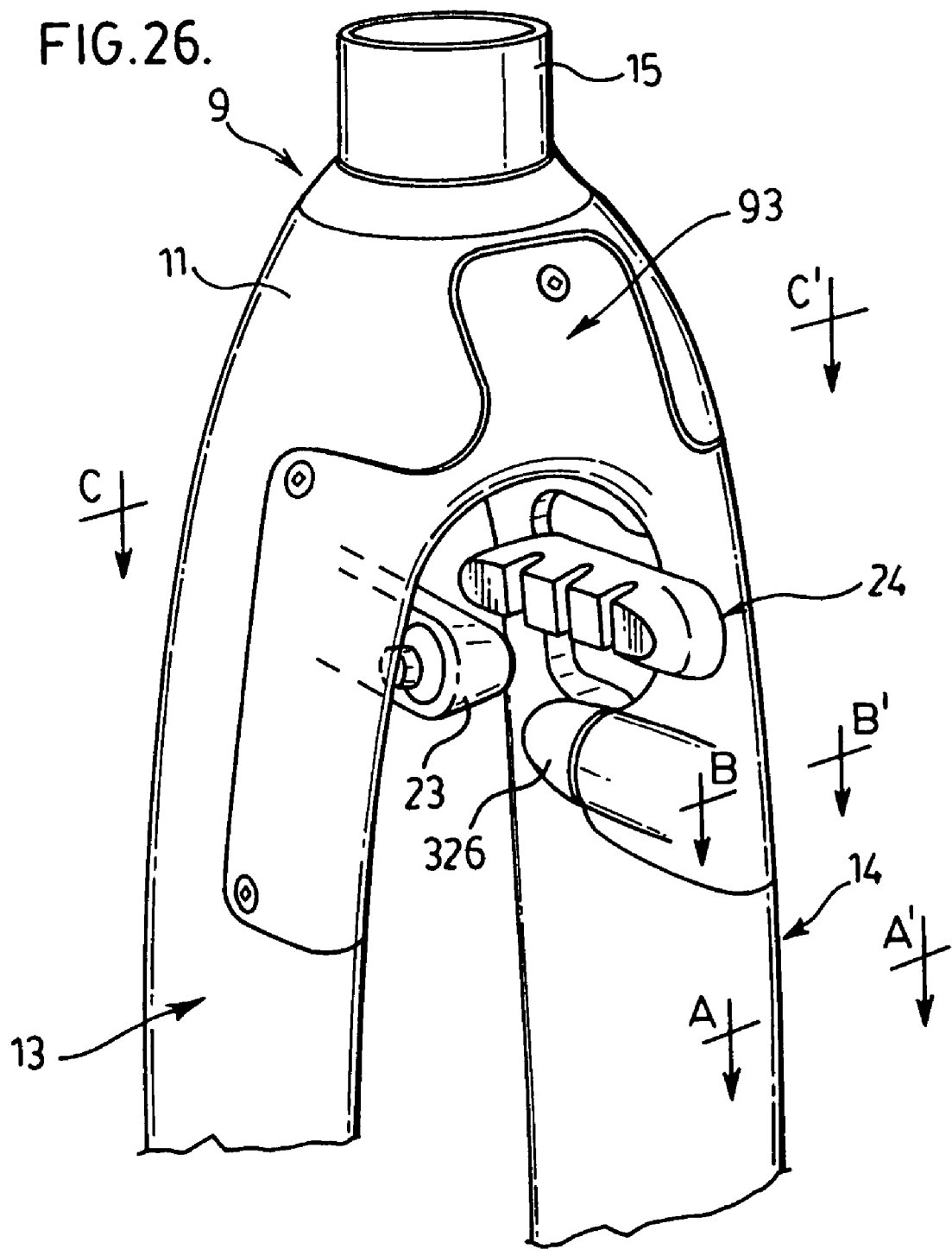

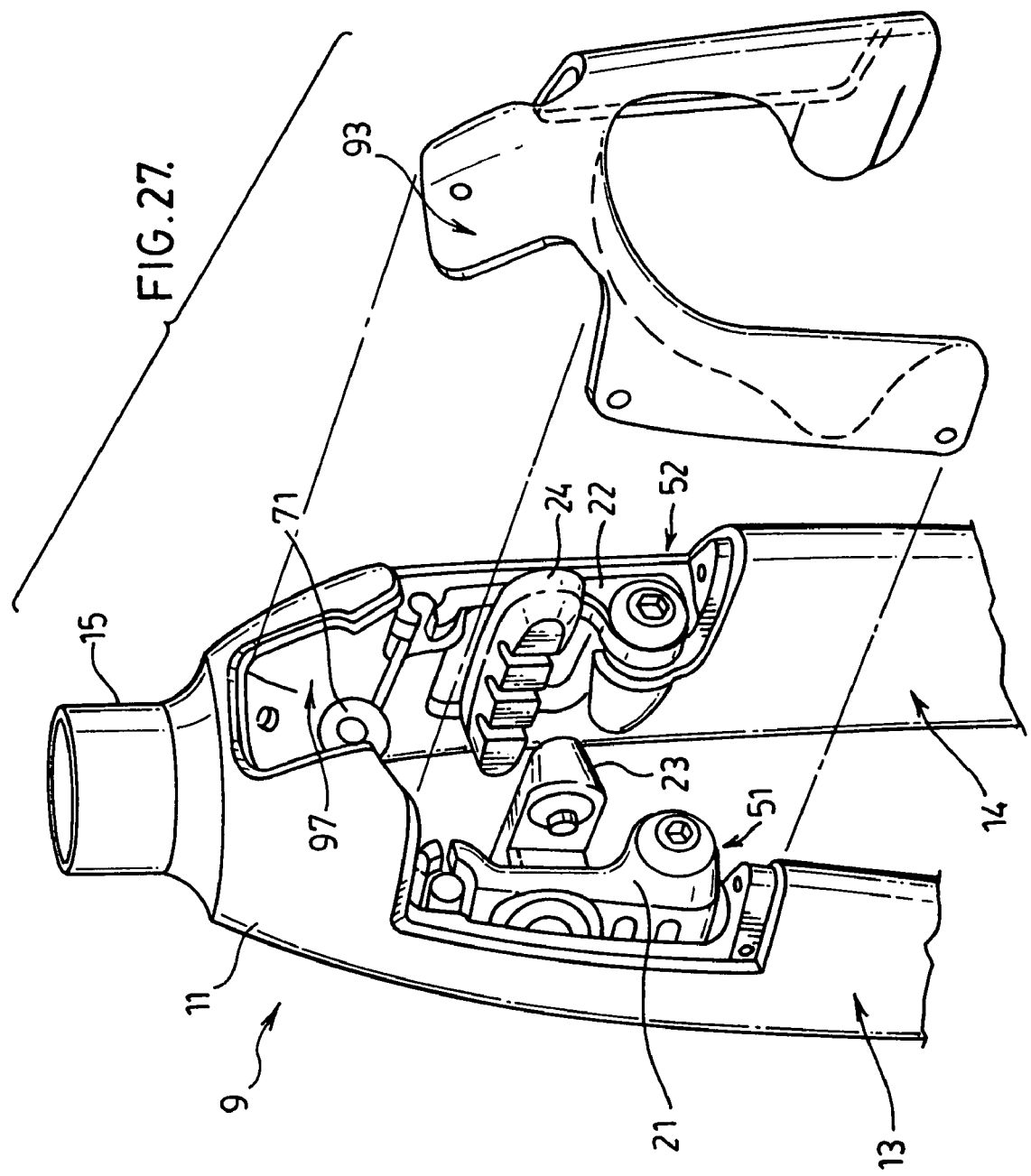

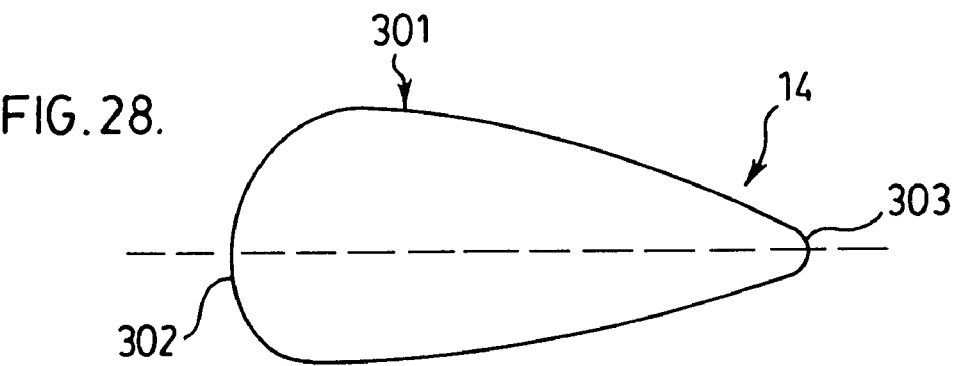
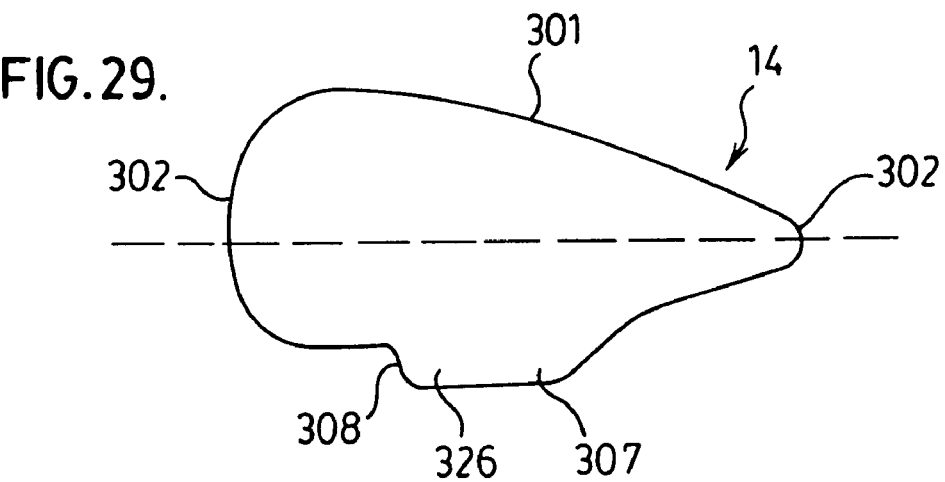
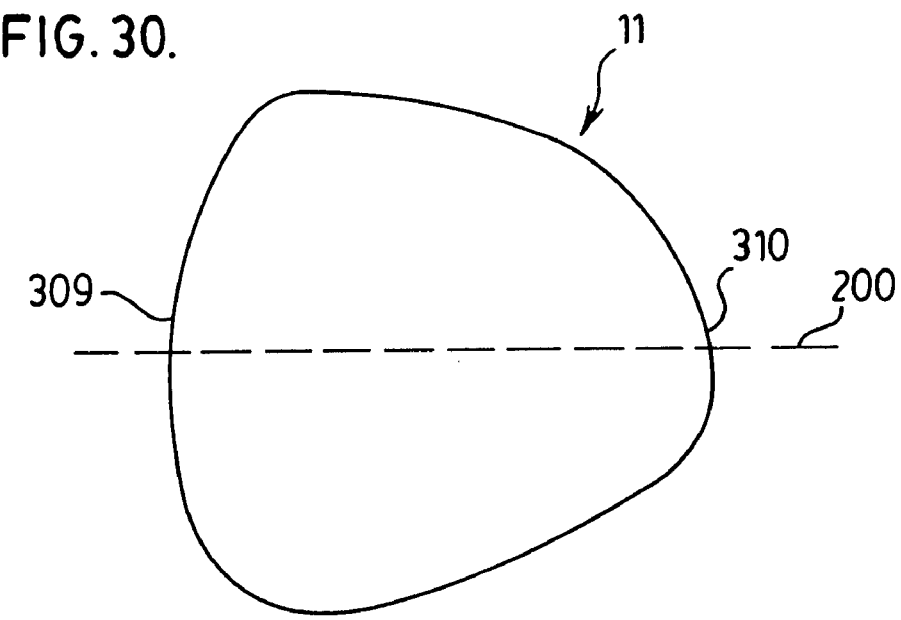

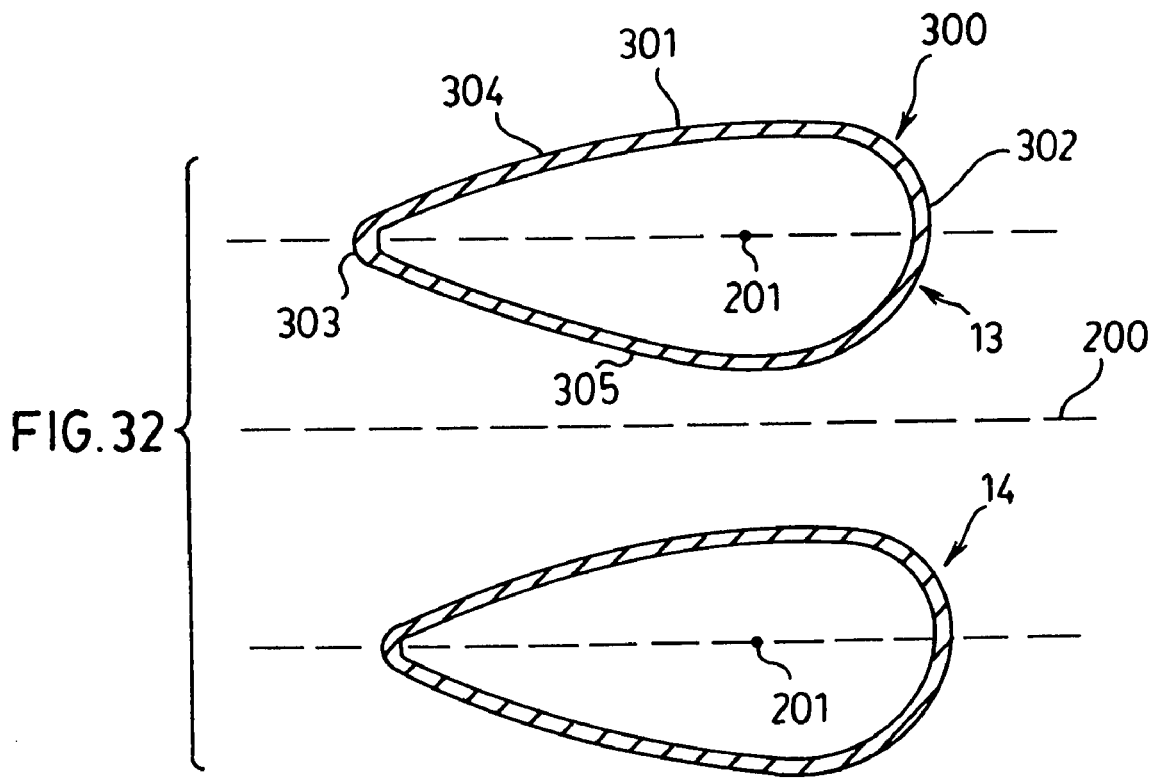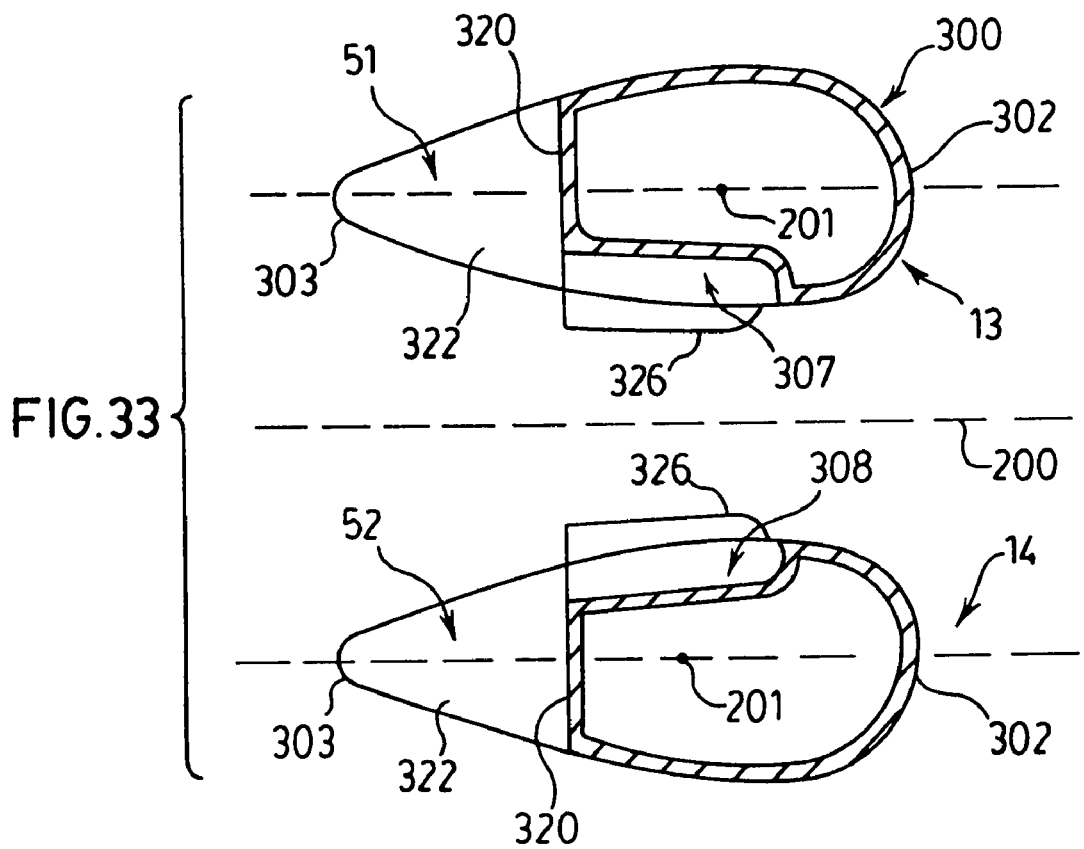

FORK WITH INTEGRATED BRAKING SYSTEM

RELATED APPLICATION

This application is related to and claims the benefit as under 35 U.S.C. 119 of U.S. Provisional Patent Application No. 60/836,685 filed Aug. 10, 2006

FIELD OF THE INVENTION

The present invention relates to cycles, more particularly bicycles and to an arrangement for integrating a brake mechanism into a wheel supporting structure including a crown section and a pair of fork arms.

BACKGROUND OF THE INVENTION

In the past, brakes typically have been attached to the fork legs of a bicycle either completely in front of or behind the forks themselves to provide for braking. The brakes could also be attached to the fork crown completely in front of or behind the fork. In one example, the brakes have a pivot bolt around which brake arm can rotate. The pivot bolt is secured to the outside of the fork legs.

Such known braking systems have been appreciated by the present inventors as not reducing the aerodynamic drag on the bicycle at the least since the components of the braking system stick out beyond the forks.

In the past, rear brakes have been attached to the chain stays by pivot bolts in which the arms of the brakes rotate about. The braking mechanism may be provided above or below the chain stays. In one example, the brakes have a pivot bolt around which the brake arm can rotate. The pivot bolt secures the braking system to the outside of the chain stays. The braking mechanism can be attached in this way either completely above or below the chain stays.

In addition, the braking mechanism may be attached to the seat stays in a similar manner as it is attached to the chain stays.

In such known braking system configurations, the components of the braking system protrude beyond the envelope of the chain stay, seat stay or seat tube, into the airstream, reducing the effect of using aerodynamic components. In addition, because the airflow around the bicycle hits each of the brake system and the fork, the fact that there are two components serves to further increase the aerodynamic drag.

SUMMARY OF INVENTION

To at least to partially overcome these disadvantages of the prior art the present invention provides in a cycle with a wheel-supporting structure comprising a crown section and a pair of forklegs, a brake assembly with lever arms mounted at least partially within cavity openings within each fork leg.

An object of the invention to provide an improved means for attaching a brake system to a cycle in an aerodynamic fashion.

In the present invention the wheel-supporting structure may comprise a front or rear bicycle fork with a braking system integrated into the fork to provide a more aerodynamic design for the forks. Where the wheel-supporting structure is the front fork, the wheel supporting structure may comprise a wheel-steering assembly pivotably attached to the cycle frame. Each of the brakes is integrated directly into the fork legs and fork crown so as to reduce any excess drag caused by the wind. The integrated brake may be provided in the middle of the fork legs or at either the front or the back of the fork legs.

In the present invention the wheel-supporting structure may comprise a pair of bicycle chain stays or a pair of seat stays wherein the braking system for the rear wheel is integrated into the chain stays or the seat stays to provide a more aerodynamic design for the chain stays or the seat stays and the brake system. Each of the brakes is integrated directly into the chain stays or seat stays so as to reduce any excess drag caused by wind. The integrated brake may be provided in the middle, the top or the bottom of the chain stays or the seat stays.

In the field of bicycle design and racing, aerodynamics plays an important role. Bicycles are now being designed to further reduce any aerodynamic drag to give the rider a further advantage over competitors or to increase their own times.

The present invention is directed to a bicycle fork in which the braking system is integrated into the fork. This integration of the brakes is designed to allow the brakes to be at least partially hidden from the airflow in the travel direction of the bicycle. The fork is designed to allow the braking system to at least partially rest within the structure of the fork when the brakes are not being engaged.

In one aspect, the present invention provides a brake system provided in the middle of the fork in a lateral direction. In this embodiment, the fork is designed with a recess in the middle of the fork legs and/or the fork crown. Both of the fork legs are provided with this recess. The braking device can then, at least partially, be fit in the recess. These recesses allow the braking mechanism to be substantially hidden from airflow so as to reduce drag. More specifically, the braking device may be surrounded on the front and rear by fork legs and/or the fork crown and so as to be substantially in the middle in the lateral direction. When the braking system is fitted within the recesses of the fork, the fork itself can be designed in an aerodynamic fashion to reduce drag without the worry of the braking mechanism obstructing the airflow. The fork legs and fork crown can therefore be designed to have an aerodynamic shape since when the brakes are not engaged fit within recesses of the fork to reduce drag. In this way, the design of the fork can be fashioned to surround the braking mechanism and increase its aerodynamic effect.

In a further aspect, the integrated braking mechanism may be provided at the front of the fork. Again, recesses are provided in the fork crown and/or each of fork legs to allow the braking mechanism to sit within such recesses. Again, these recesses allow the fork to be designed in an aerodynamic fashion to reduce drag. However, in this embodiment the recesses are provided at the front of the fork open to the front. When the braking mechanism is not being engaged, the braking mechanism, at least partially, rests in the recesses so as to reduce drag. Reducing the area of the bicycle frame in the airflow direction increases the aerodynamic effects of the bicycle and reduces drag. Therefore, by having the braking mechanism fit within the recesses, the drag is reduced. When the braking mechanism is provided at the front, the rest on the bicycle fork can be designed in an aerodynamic fashion to reduce drag. Furthermore, a shroud may be provided over the braking mechanism forward of the brakes to further increase the aerodynamic effects of the fork.

In a still further aspect, the integrated braking mechanism may be provided at the back of the fork. This embodiment is very similar to the embodiment with the braking mechanism integrated at the front of the fork but the recesses are now provided at the rear open to the rear. In this embodiment, the fork can be designed to be an aerodynamic fashion in the travel direction of the bicycle. The recesses allow the braking mechanism, at least partially to fit within the structure of the bicycle frame. Again, drag is reduced because the area of the bicycle fork is reduced in the airflow direction.

By integrating the braking mechanism into the fork, the fork can be designed in an aerodynamic fashion and such a design also includes the braking mechanism. Furthermore, the area of the bicycle in the airflow direction is reduced because the brakes are now a part of the fork itself. Also, since the braking mechanism and the fork are one component, airflow problems resulting from the fork and braking mechanism being two separate components have now been eliminated.

The braking mechanism provided in the fork may comprise any manner of braking mechanisms including but not limited to the following types of braking mechanisms: Cantilever, Inverted Cantilever, Center-pull, Compound Linkage, Simplified Compound Linkage, Hydraulic Cylinder with Linkage, Ball Screw Actuator with Linkage, Profiled Cam, Hydraulic Cylinder and Ball Screw.

The present invention also envisions the use of the chain stays and the seat stays as portions of structure into which a brake assembly can be integrated to reduce drag. The invention provides bicycle chain stays and seat stays in which the braking system is integrated into the chain stays or seat stays to allow the braking system to at least partially rest within the structure of the chain stays when the brakes are not engaged. The brake system may be provided in recesses provided in the middle, at the top or at the bottom of the chain the recess. These recesses allow the braking mechanism to be substantially hidden from airflow so as to reduce drag. When the braking system is fitted within the recesses of the chain stay, the chain stays can be designed in an aerodynamic fashion to reduce drag without the worry of the braking mechanism obstructing the airflow. The chain stay can therefore be designed to have an aerodynamic shape since when the brakes are not engaged they would fit at least partially within recesses of the chain stay to reduce drag. In this way, the design of the chain stay can be fashioned to at least partially surround the braking mechanism and increase its aerodynamic effect.

When the braking mechanism is provided at the top or the bottom of the chain stays, the rest of the chain stay can be designed in an aerodynamic fashion to reduce drag. Furthermore, a shroud may be provided over the braking mechanism to further increase the aerodynamic effects of the chain stays.

By integrating the braking mechanism into the chain stay, the chain stays can be designed in an aerodynamic fashion and such a design also includes the braking mechanism. Furthermore, the area of the bicycle in the airflow direction is further reduced because the brakes are now a part of the chain stay itself. Also, since the braking mechanism and the chain stays are one component, airflow problems resulting from the chain stays and the braking mechanisms being two separate components have now been eliminated.

In one aspect the present invention provides a cycle comprising: a frame; a wheel-supporting structure comprising a crown section and a dual fork section, said dual fork section comprising first and second fork members attached to said crown section; the wheel-supporting structure symmetrical about a central plane intermediate the first and second fork members, a wheel rotatably attached to said fork members centered therebetween for rotating about a wheel axis normal the central plane; the wheel having a first side and a second side, the bicycle is adapted for forward movement in a horizontal forward direction lying in the central plane, a brake assembly carried on the wheel-supporting structure, the brake assembly having a first and second lever arms, the first fork member elongate about a first longitudinal, the first fork member having an external surface which has in horizontal cross section a tear drop shape with an enlarged rounded forwardly directed front portion tapering to a reduced width rear portion, a first access opening extending laterally through the first fork member providing access normal to the central plane from outside of the first fork member through the first fork member to the wheel, the first access opening open through the rear portion extending inwardly from the rear portion of the first fork member to a rearwardly directed forward wall of the first access opening, the first access opening extending longitudionally of the first fork member from a downwardly directed upper wall to an upwardly directed lower wall, a first brake axle member mounted to the first fork member in the first access opening in a cantilevered arrangement to the forward wall of the first access opening with an inboard end fixedly secured to the forward wall of the first access opening and the first brake axle member extending rearwardly about a first brake axis to an unsupported distal end; the first brake axis being normal to the wheel axis and parallel to the central plane, the first lever arm pivotably mounted to the first brake axle member in the first access opening for pivoting about first brake axis, the first lever arm carrying a first brake pad disposed to move toward the central plane to engage the first side of said wheel when said brake assembly is actuated, the second fork member elongate about a second longitudional, the second fork member having an external surface which has in horizontal cross section a tear drop shape with an enlarged rounded forwardly directed front portion tapering to a reduced width rear portion, a second access opening extending laterally through the second fork member providing access normal to the central plane from outside of the second fork member through the second fork member to the wheel, the second access opening open through the rear portion extending inwardly from the rear portion of the second fork member to a rearwardly directed forward wall of the second access opening, the second access opening extending longitudionally of the second fork member from a downwardly directed upper wall to an upwardly directed lower wall, a second brake axle member mounted to the second fork member in the second access opening in a cantilevered arrangement to the forward wall of the second access opening with an inboard end fixedly secured to the forward wall of the second access opening and the second brake axle member extending rearwardly about a second brake axis to an unsupported distal end; the second brake axis being normal to the wheel axis and parallel to the central plane, the second lever arm pivotably mounted to the second brake axle member in the second access opening for pivoting about second brake axis, the second lever arm carrying a second brake pad disposed to move toward the central plane to engage the second side of said wheel when said brake assembly is actuated.

In another aspect the present invention provides a cycle comprising: a frame; a wheel-supporting structure comprising a crown section and a dual fork section, said dual fork section comprising first and second fork members attached to said crown section; the wheel-supporting structure symmetrical about a central plane intermediate the first and second fork members, the first fork member elongate about a first longitudinal, the second fork member elongate about a second longitudinal, a wheel rotatably attached to said fork members centered therebetween for rotating about a wheel axis normal the central plane; the wheel having a first side and a second side, a brake assembly carried on the wheel-supporting structure, the brake assembly having a first and second lever arms, the first lever arm pivotably mounted to the first fork member for pivoting about a first brake axis normal to the wheel axis, parallel to the central plane and generally normal to the longitudional of the first fork member; a first brake axle member mounted in cantilevered arrangement to the first fork member with an inboard end fixedly secured to the first fork member extending about the first brake axis to an unsupported distal end; the first lever arm carrying a first brake pad disposed to move toward the central plane to engage the first side of said wheel when said brake assembly is actuated; the first lever arm having an external surface facing away from the wheel, the first fork member having an external surface facing away from the wheel, a first access opening laterally through the first fork member providing access normal to the central plane from outside of the first fork member through the external surface of the first fork to the exterior surface of the first brake lever, a first spring member biasing the first lever arm to pivot about the first brake axis moving the first brake pad away from the first side of the wheel to an inactive position of the first lever arm in which: (a) the external surface of the first lever arm comprises a substantially co-planar extension of the external surface of the first fork about the first access opening, with (b) the external surface of the first lever substantially filling the first access opening; the second lever arm pivotably mounted to the second fork member for pivoting about a second brake pivot normal to the wheel axis, the second lever arm pivotably mounted to the second fork member for pivoting about a second brake axis normal to the wheel axis, parallel to the central plane and generally normal to the longitudional of the second fork member; a second brake axle member mounted in cantilevered arrangement to the second fork member with an inboard end fixedly secured to the second fork member extending about the second brake axis to an unsupported distal end; the second lever arm carrying a second brake pad disposed to move toward the central plane to engage the second side of said wheel when said brake assembly is actuated; the second lever arm having an external surface facing away from the wheel, the second fork member having an external surface facing away from the wheel, a second access opening laterally through the second fork member providing access normal to the central plane from outside of the second fork member through the external surface of the second fork member to the exterior surface of the second brake lever, a second spring member biasing the second lever arm to pivot about the second brake axis moving the second brake pad away from the second side of the wheel to an inactive position of the second lever arm in which: (a) the external surface of the second lever arm comprises a substantially co-planar extension of the external surface of the second fork member about the second access opening, with (b) the external surface of the second lever substantially filling the second access opening; a mechanism for actuating said brake assembly.

Further aspects of the invention will become apparent upon reading the following detailed description and drawings, which illustrate the invention and preferred embodiments of the invention.

BRIEF DESCRIPTION OF THE DRAWINGS

In the drawings, which illustrate embodiments of the invention:

FIG. 1 illustrates a front view of a first embodiment of a fork with a mid mounted brake system.

FIG. 2 illustrates a side view of the fork of FIG. 1.

FIG. 4 illustrates a rear perspective view of the fork of FIG. 1.

FIG. 26 is a perspective rear of a third embodiment of a fork with the mounted brake system in accordance with the present invention.

FIG. 27 is an exploded rear perspective view of the fork of FIG. 26.

FIGS. 28, 29 and 30 are schematic cross sectional views along section lines A-A', B-B' and C-C" respectively in FIG. 26 showing the exterior surfaces.

FIGS. 32, and 33 are a cross sectional views along section line A-A' and B-B' respectively in FIG. 8.

DETAILED DESCRIPTION OF THE PREFERRED EMBODIMENTS

Preferred embodiments of the invention and its advantages can be understood by referring to the present drawings.

Figure 31:
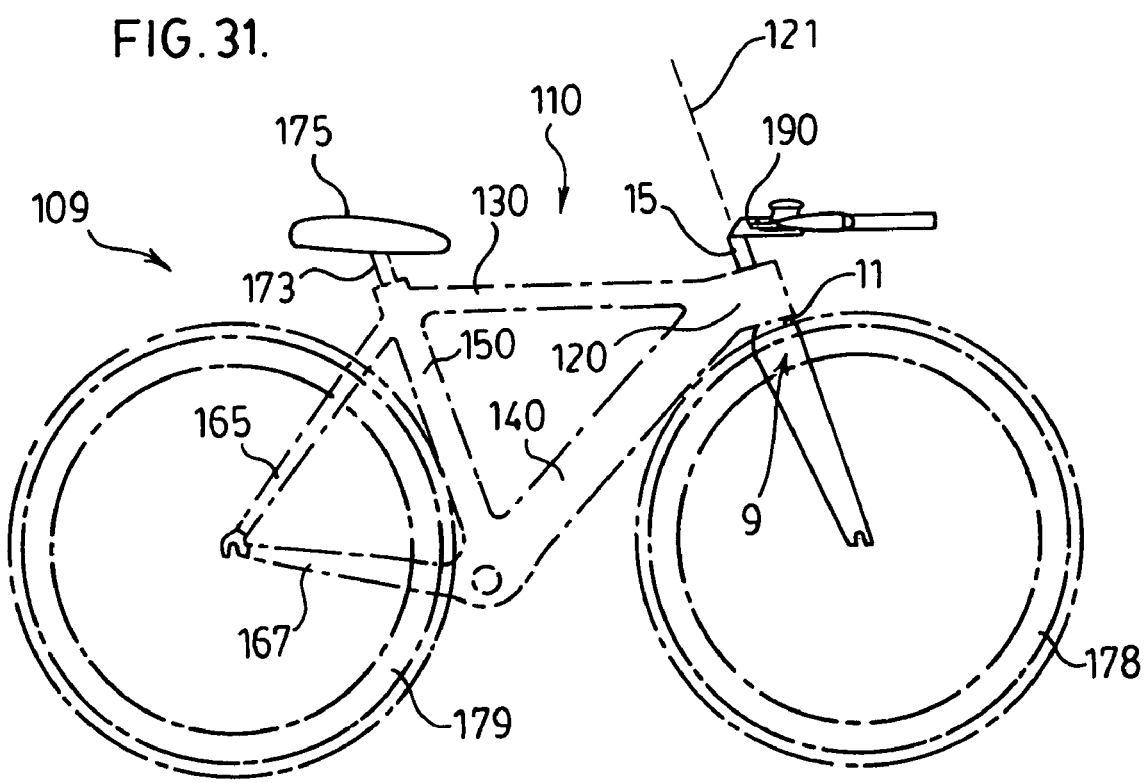
FIG. 31 is a side view of a bicycle in accordance with the present invention.

Reference is made to FIG. 31 which is a side view of a bicycle 109 in accordance with a first embodiment of the invention. The bicycle 109 has a frame 110 comprising a head tube 120, a top tube 130, a down tube 140 and a seat tube 150.

Each of these tubes are connected end-to-end to one another and form substantially a closed main frame loop A seat post 173 is supported by an upper end of the seat tube 150 and carries a seat 175.

A front fork 9 is pivotably coupled to the head tube 120 by extending through the head tube. The front fork 9 has a steerer tube 15 which extends upwardly to be journalled inside the head tube 120 of the bicycle frame and pivotably mount the front fork 9 to the frame for pivoting about a pivot axis 121. The fork 9 carries at an upper end of the steerer tube 15 handlebars 190. The fork 9 has a fork crown 11 which splits into a pair of fork legs (also referred to as fork arms) supporting the front wheel 178. A pair of seat stays 165 and chain stays 167 extend rearwardly from the seat tube 150 and join to support a rear wheel 179 journalled on a rear axle extending between the rear ends of the seat stays 165 and chain stays 167.

Reference is made to FIGS. 1 to 4 showing a first embodiment of the integrated fork and brake structure in accordance with the present invention in which the brake structure is integrated into the front fork 9 of the type shown in FIG. 31. As can be seen in FIG. 4 the braking mechanism is substantially hidden inside the fork 9 in order to reduce the drag and increase its aerodynamic design As shown in FIGS. 1 to 4, the steerer tube 15 is connected to the fork crown 11. The fork crown 11 is further connected to two fork legs 13, 14. The fork 9 is symmetrical about a central plane 200 shown in FIG. 1 intermediate the fork legs 13, 14. The front wheel 178 shown in FIG. 31 is rotatable about a wheel axis normal to the central plane. The bicycle of FIG. 31 is adapted for forward movement in a horizontal forward direction lying in the central plane. Each of the fork members is generally elongate about a longitudinal axis generally indicated as 201 in FIGS. 1 and 2.

Also shown in FIG. 1 are the brake pads 23, 24 and brake springs 31, 32. The brake pads 23, 24 and the brake spring 31 extend inwardly from the structure of the fork 9. However, the rest of the braking mechanism cannot be seen in the front view direction by the manner in which it is incorporated into the structure of the fork 9. FIG. 1 illustrates the area that would be in the airflow with normal horizontal movement of the bicycle forwardly. FIG. 1 thus illustrates how the fork is designed in an aerodynamic fashion so as to reduce drag.

FIG. 2 shows in side view that the brake system is situated mid way between the front of the fork and the rear of the fork in an access opening or recess 51 provided through the middle of the fork leg 13 extending upwardly into the fork crown 11. A similar recess 52 is provided in fork leg 14. The recesses 51, 52 provides a space for braking components to sit in when the brakes are not being engaged. FIGS. 1 to 4 illustrates this embodiment when the brakes are not engaged and as can be seen braking components fit within the recesses 51, 52 of the fork 9. These recess 51, 52 allows braking components to at least partially be hidden so as to improve the aerodynamic design of the fork.

FIG. 2 shows a brake lever arm 21 attached to a brake pad 23 by a brake pad anchor screw 29. The brake pad anchor screw 29 allows the brake pad 23 to be adjusted in the longitudinal direction of the lever arm 21, that is up and down as illustrated in FIG. 2. This adjustment allows for the brake pad to engage the bicycle wheel (not shown) at the best possible height. To facilitate this adjustment, the brake pad anchor screw 29 can be loosened and the brake pad 23 can be moved the in vertically on the lever arm 21 to the desired placement. When the desired placement is achieved the brake pad anchor screw 29 is tightened to secure the brake pad 23 in place.

Figure 3:
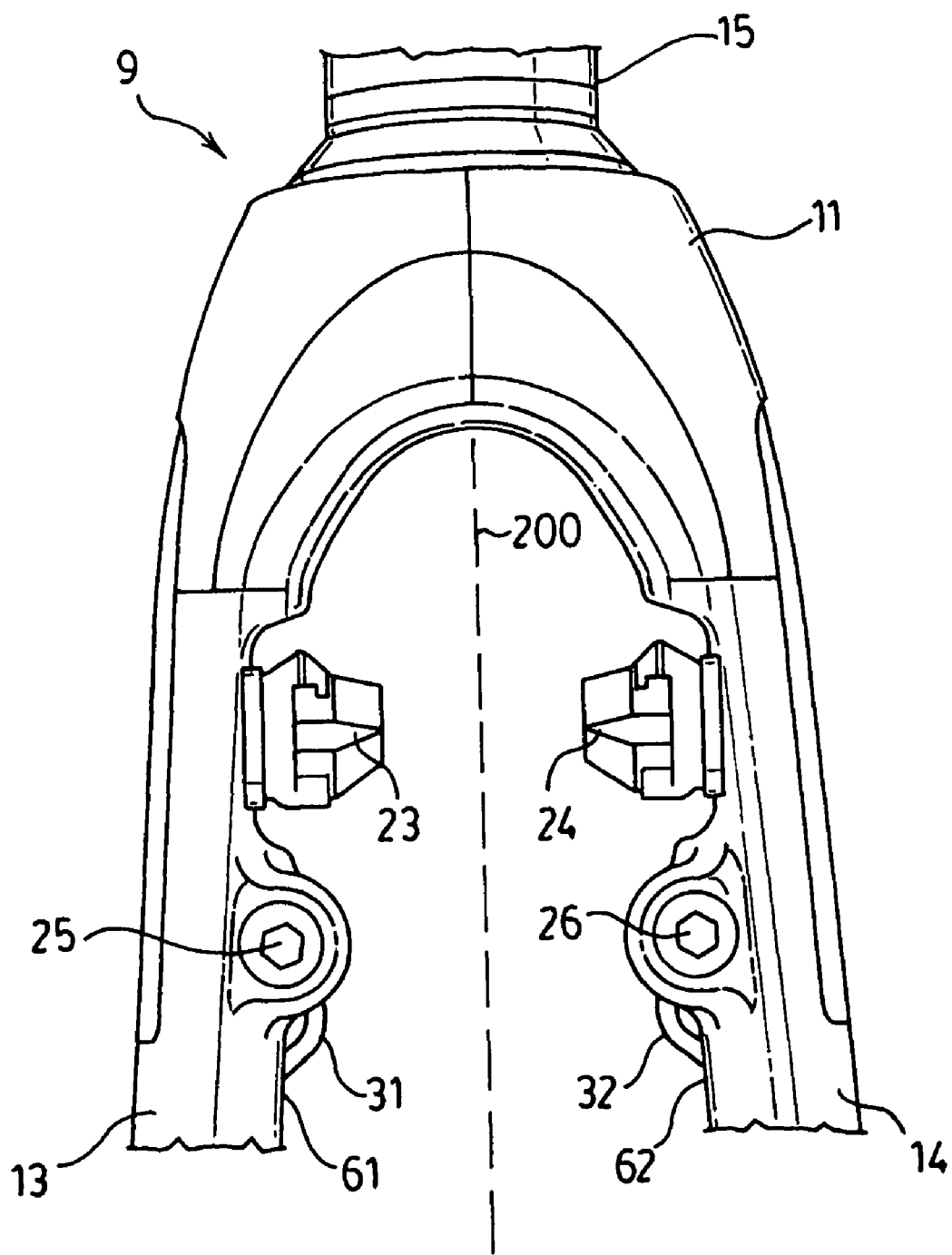
FIG. 3 illustrates a rear view of the fork of FIG. 2.

FIG. 3 is a rear view of the fork of FIG. 1. FIG. 3 shows brake pads 23, 24, pivot bolts 25, 26, brake springs 31, 32 and pivot bolts 25, 26. The pivot bolts 25, 26 are located below the brake pads 23, 24. on which the brake lever arms 21, 2 are pivotably mounted relative each fork leg 13, 14. The brake springs 31, 32 are fitted into slots 61, 62 provided in the inner side of the fork legs. These brake spring slots 61, 62 provide an anchor point for the brake springs 31, 32. The brake springs 31, 32 bias the brake lever arms 21, 22 to pivot on the pivot bolts to return to the unengaged position. The brake lever arms 21, 22 are seen in FIG. 4 and cannot be seen from the front view of FIG. 1 because they are hidden within the structure of the fork 9.

FIG. 4 illustrates a rear perspective view showing that the brake lever arms 21, 22 are connected to the fork legs 13, 14 by the pivot bolts 25, 26, respectively. The brake pads 23, 24 are attached to the brake lever arms 21, 22 by use of the brake pad anchor screws 29. FIG. 4 further illustrates the recess 52 in fork leg 14 and the fork crown 11 that allows the brake arm 22 to sit within the fork structure. Also illustrated is the slot in the exterior surface of the brake lever arm 21 which the brake pad anchor screw 29 sits in order to permit adjustment of the brake pad 23. The brake spring slot 62 in which the brake spring 32 can sit is also illustrated. As illustrated, the brake lever arm 22 carries two apertured bosses 63 and 65 through which the pivot bolt 25 extends with the pivot bolt 25 bolt secured at both ends to the fork leg 14.

Reference is made to FIGS. 5 to 8, 17, 32 and 33 which illustrate a second embodiment of an integrated fork with a rear mounted brake structure in which access openings or recesses 51, 52 are located at the rear of the fork 9 open to the rear and are cut out the fork legs 13, 14. This rear mounted brake structure allows the front of the fork 9 to be designed in an aerodynamic fashion and keeps the brake system hidden within the structure of the fork 9 as seen in front view in FIG. 5.

Figure 6:
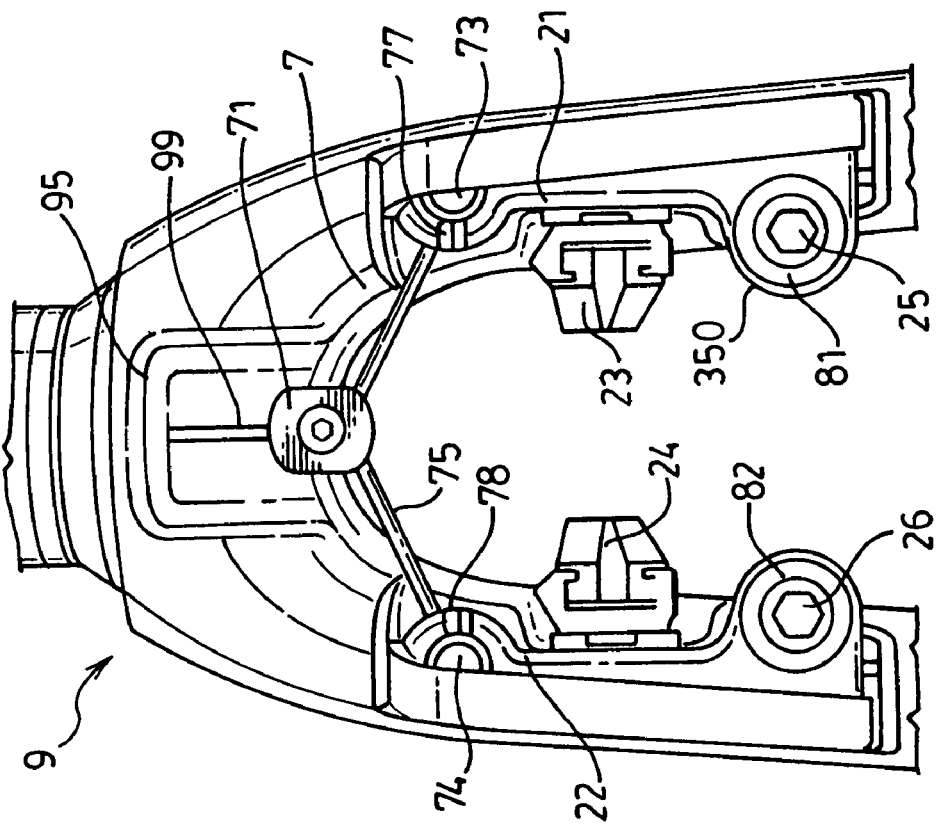
FIG. 6 illustrates a rear view of the fork of FIG. 5.
Figure 17:
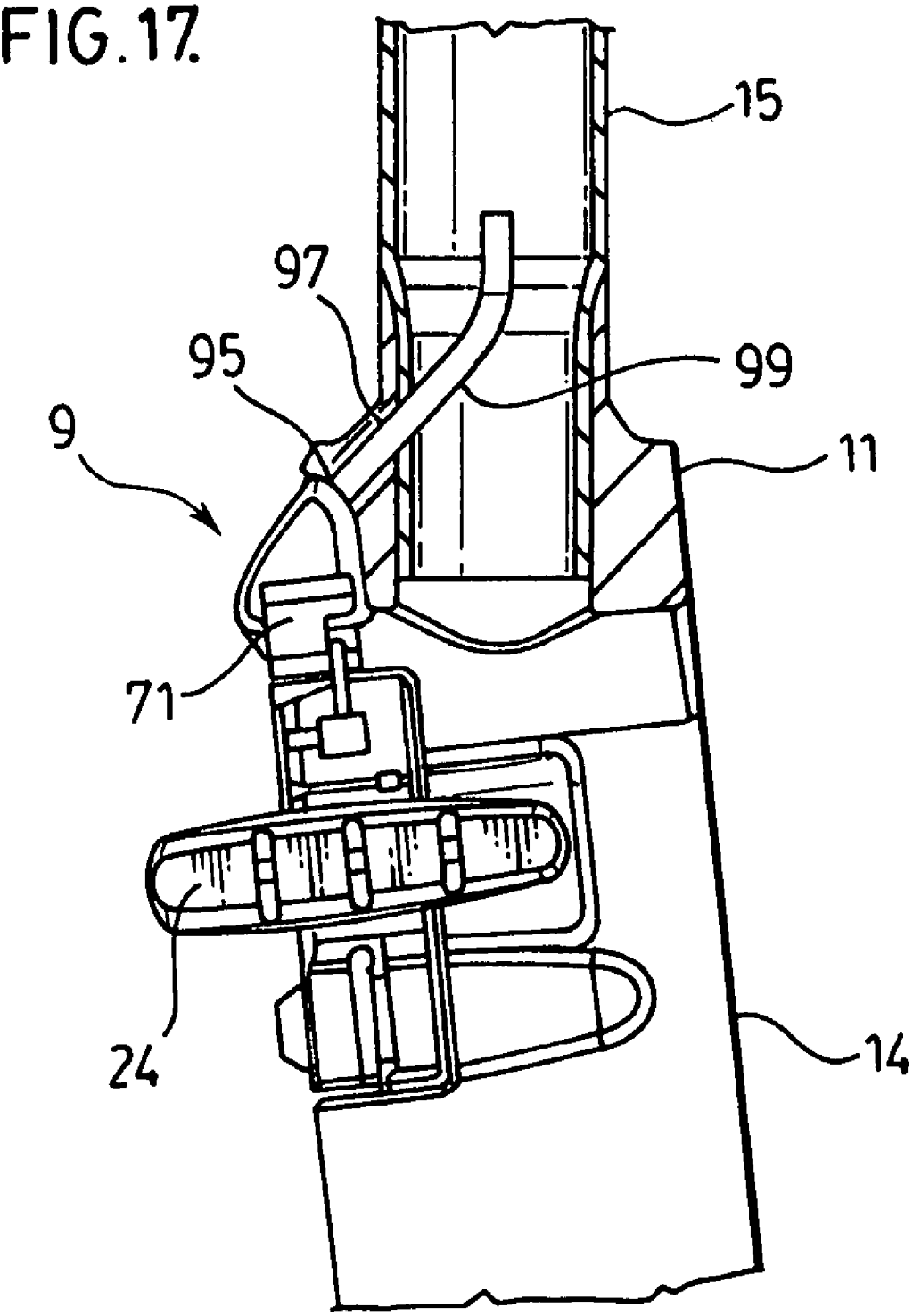
FIG. 17 is a cross-sectional side view of the fork of FIG. 5 along a central plane in FIG. 5 showing the cable guide grommet for the integrated brake with the rear mounted brake system.

As shown in FIG. 6, the braking mechanism includes a straddle bridge 71 and straddle cable 75. The straddle cable 75 has ferrules 73, 74 at either end. The ferrules 73, 74 fit into slots 77, 78 at the end of the brake lever arms 21, 22. When the rider pulls on a brake hand operated lever (not shown) carried on the handle bars, a brake cable 99 pulls the straddle bridge 71 up into a cavity 97 at the rear of the crown 11. While not necessary the cable may extend from the straddle bridge 71 through a cable guide exit grommet 95 in the crown 11 such that the cable may pass internally through the steerer tube 15 as seen in FIG. 17 to be routed to the handle bar mounted hand operated brake lever. Upward movement of the straddle bridge 71 causes the brake pads 23, 24 to move inwardly towards each to engage the wheel of the bicycle (not shown) pinching the rim of the wheel therebetween. The brake lever arms 21, 22 pivot around the pivot bolts 25, 26. The braking mechanism shown in FIG. 6 is a Cantilever brake system of the type also schematically shown in FIG. 25. The pivot axis 81, 82 coaxial with the pivot bolts 25, 26 about which the for the brake lever arms are pivotally mounted are below the brake pads so that when the straddle bridge 71 is moved upward the brake lever arms rotate around the axis 81, 82 to move the brake pads towards each other.

Figure 5:
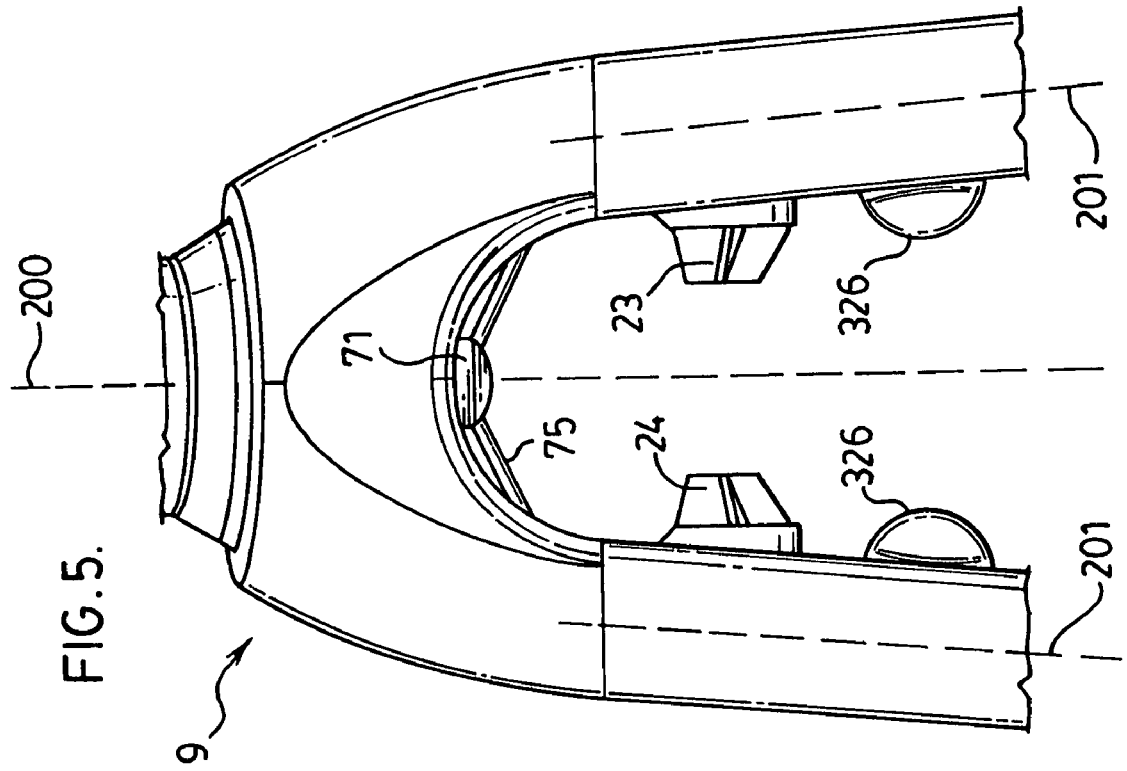
FIG. 5 illustrates a front view of a second embodiment of an integrated fork with a rear mounted brake system.

FIG. 17 is a cross sectional side view of FIG. 5 along central plane 200 showing the cable guide grommet 95 as in an integrated fork 9 with a rear mounted brake system. FIG. 17 shows the cable guide grommet 95 is in the fork crown 11. The cable guide grommet provides an opening through which the brake cable 99 travels through the interior of the fork crown 11 to the hollow interior of the steerer tube 15. The brake cable 99 can then travel to the handlebars and hand lever. It is understood that similar cable guide exit point structures may be used in the integrated fork with mid or front mounted brake systems. It is also understood that the cable guide grommet may be of a different shape or in a different position depending on the design of the fork and position of the brake system. Internal routing of the brake cable is not necessary but is preferred.

The brake spring 31 contacts the fork leg 13 to bias the brake arm 21 to an open, unengaged position away from the wheel of the bicycle when the brake system is not engaged. Each pivot bolt 25, 26 serve as a brake axle member for their respective lever arm. Each pivot bolt is attached in a cantilevered arrangement to a front wall 320 of the recesses 51, 52 in the fork legs 13, 14 at one forward inboard end of the pivot bolt which is fixedly secured to the fork leg and the pivot bolt extend rearwardly to an unsupported distal end.

Figure 7:
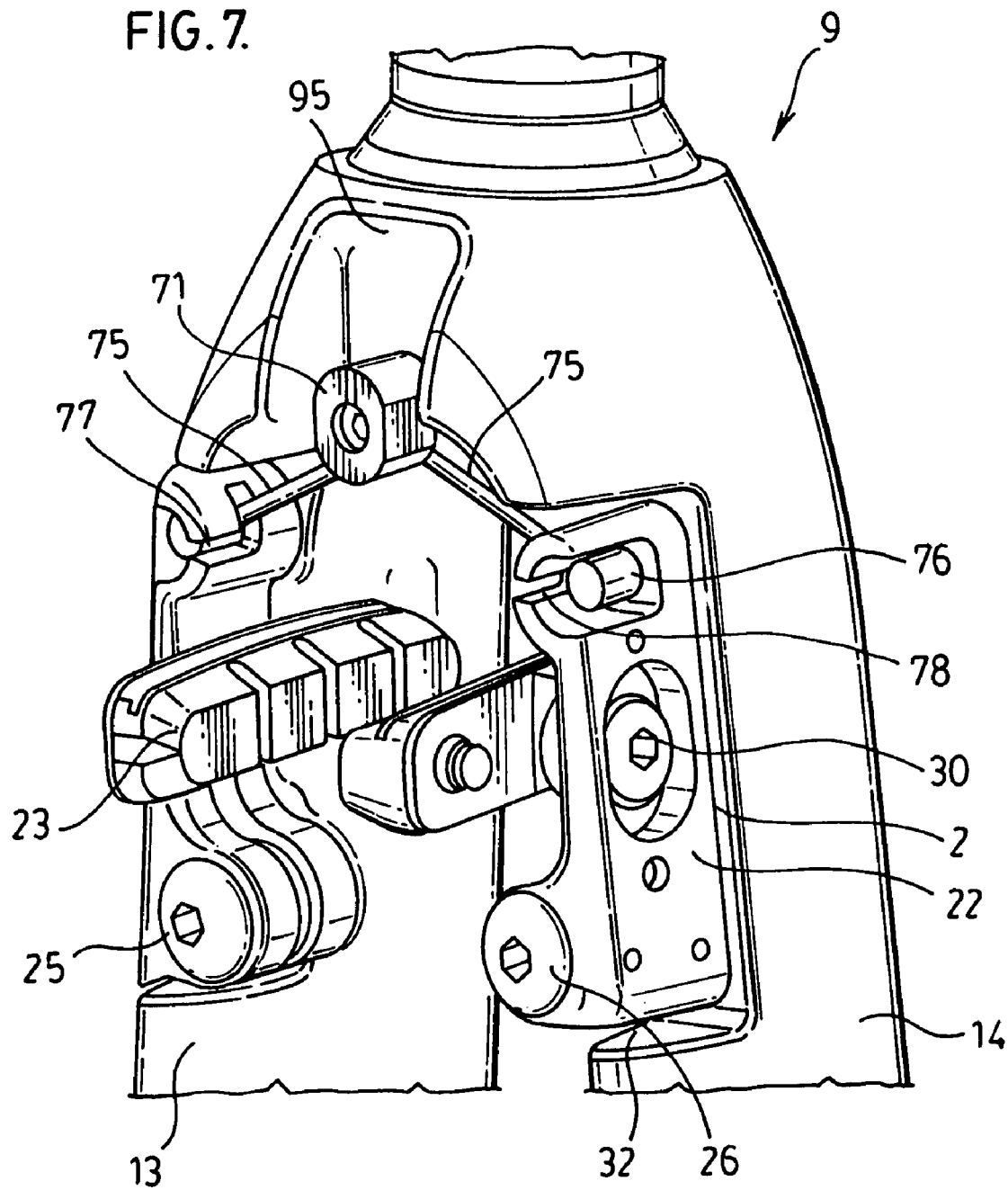
FIG. 7 illustrates a rear perspective view of the fork of FIG. 5.
Figure 8:
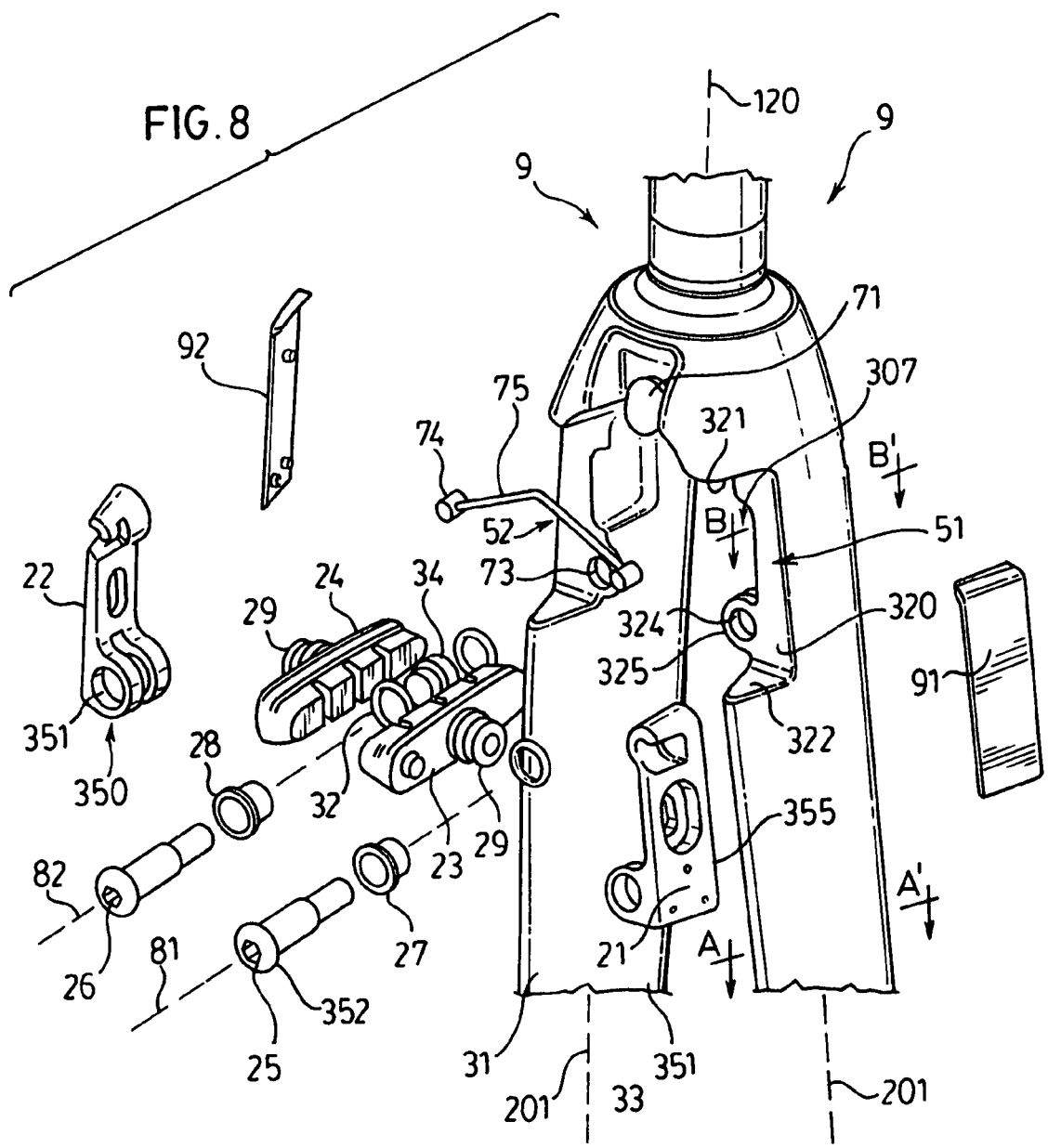
FIG. 8 illustrates an exploded view of the fork of FIG. 7.

FIG. 8 shows an exploded view of the integrated fork with a rear mounted brake system shown in FIG. 7. FIG. 8 additionally shows shrouds or cover plates 91, 92 that are to be secured to the exterior side of each brake lever arm to cover the brake lever arm to increase the aerodynamic flow and design of the fork. The cover plates 91, 92 may be clipped or otherwise attached to the brake lever arms 21, 22. While not shown in FIG. 8, the cover plates s 91, 92 could be attached to the fork arms to continue the aerodynamic design of the fork arms to their rear.

FIG. 8 shows bushings 27, 28 that surround the pivot bolts 25, 26 and facilitate pivoting of the brake lever arms 21, 22 on the pivot bolts.

The front fork 9 is symmetrical about a central plane 200 shown in FIG. 5 intermediate the fork legs 13, 14. The front wheel 178 shown in FIG. 31 is rotatable about a wheel axis normal to this central plane 200. The bicycle of FIG. 31 is adapted for forward movement in a horizontal forward direction lying in the central plane. Each fork leg is generally elongate about a longitudional axis generally indicated as 201 in FIGS. 5 and 8. The fork 9 is journalled to the head tube 120 for pivoting about the pivot axis 120 as marked on FIG. 8 which pivot axis lies in the central plane 200.

Reference is made to FIG. 32 which shows a horizontal cross sectional view through the fork legs 13, 14 through section line A-A' in a forward direction which the bicycle is to be moved. As seen, each of the fork legs 13 and 14 has an exterior wall 300 with an exterior surface 301 in a preferred shape to reduce drag. The preferred shape is an oval and more preferably a tear drop shape having and enlarged rounded front portion 302 tapering rearwardly to a reduced sized rounded rear portion 303. Each of the sides 304 and 305 of the exterior surface preferably are of an enlarged radius and convex. Each of the fork legs is preferably symmetrical above a plane generally indicated as 312, parallel to the central plane 200, and including the longitudinal axis 201 about which each of the fork arms extends.

Reference is made to FIG. 33 which illustrates a cross section through the fork legs 13, 14 of FIG. 8 along section B-B'. FIG. 33 shows the cross section of each of the fork legs 13 and 14 being reduced at its rear portion 303 to provide the recesses 51 and 52 and being reduced on their internal sides to provide cavities 307, 308 to receive the forward end of the respective brake pads.

One of the fork legs 13 will now be described in greater detail the other fork leg 14 being a mirror image. The recess 51, as seen in FIGS. 8 and 33, is now referred to a first access opening 51. The access opening 51 in the rear of the fork leg 13 is defined by a rearwardly directed forward wall 320, a downwardly directed upper wall 321 and an upwardly directed lower wall 322. The access opening 51 can be seen to extend laterally through the fork leg 13 providing access laterally from outside the fork arm 13 through the fork arm 13 to the interior of the fork 9 as to where a wheel would be located. The access opening 51 is also open through a rear portion 303 of the fork leg extending inwardly from the rear portion 303 of the fork leg to the forward wall 320. The access opening 51 extends longitudinally of the fork leg 13 from the upper wall 321 to the lower wall 322. A brake axle socket 324 extends from the forward wall 320 forwardly. On the inward side of the brake axle socket 324 a socket wall 325 extends as a protrusion 326 from the exterior surface of the fork leg 13 on an inner side of the fork leg and directed towards the central plane 200. The protrusion 326 is generally semi-circular about the brake axle socket 324 and is provided to have a rounded forward end. The protrusion 326 appears to have the shape and appearance of half of a torpedo as may be seen in FIG. 33. The protrusion 326 is shaped to have an aerodynamic shape to minimize drag of passing air.

Above the protrusion 326, a pad recess 307 is provided open at a rear end to the forward wall 320 and closed at a forward end. In an assembled brake mechanism, the brake pad 23 as carried on the lever arm 21 extends rearwardly of the access opening 51 and into the pad recess 307. This permits the brake pad 23 to be disposed between a wheel located inwardly from the fork arm 13 and inwardly directed exterior surfaces of the fork arm 13.

The lever arm 21 carries at its lower end a boss 350 with a circular opening 351 through which the pivot bolt 25 extends to serve as a brake axle.

The pivot bolt 25 is fixedly secured within the brake axle socket 324. The boss 350 in an assembled brake mechanism is rearward of the semi-circular protrusion 326 with the boss 350 substantially hidden as seen in front view by the fork leg 13 and its semi-circular protrusion 326. The boss 350 preferably has a circular exterior surface sized to substantially correspond to the semi-circular surfaces of the protrusion 326 when seen in front view.

The pivot bolt 25 has an enlarged head 352 which as shown is sized so as to be of reduced size compared to the boss 350 of the brake lever arm 21 and also to be hidden as seen in front view by the fork leg 13 and its protrusion 326. The bolt head 352 preferably tapers to its rear.

The pivot bolt 25 is disposed about the brake axis 81 which is parallel to the centre plane 200 and normal to the axis about which the front wheel rotates.

Referring to FIG. 8, the brake lever arm 21 has an external surface 355 facing way from the central plane 200. In an inactive position of the brake lever arm 21, the external surface 355 of the brake lever arm 21 is within the first access opening 51 within an area bounded by a substantially co-planar extension of the external surface of the fork leg 13 about the first access opening 51. The spring member 31 biases the brake lever arm 21 to pivot about the pivot bolt 25 to this inactive position for example being in a position which an outer surface of the brake pad 23 engages the inwardly directed surface of the pad recess 340. In this inactive position, the external surface 355 of the brake lever arm 21 is within the first access opening 51, that is, it is inwardly of an extension of the external surface of the fork leg 13 about the first access opening 51 such that the co-planar extension would adopt the same tear drop shape as does the exterior surface of the fork leg 13 as seen in FIG. 32.

The cover member 91 is removably secured to the exterior surface 355 of the brake lever arm 21. The cover member 91 substantially closes laterally the outward periphery of the first access opening 51, preferably with the cover member 91 having an outwardly directed external surface which is a co-planar extension of the external surface of the fork leg 13 so as to form between the covering member 91 and the exterior surface of the fork leg 13 a continuation of the tear drop shape of the fork member 13, when the break lever arm 31 is in the inactive position.

The cover member 91 is not necessary in which case it is preferred that the external surface 355 of the brake lever arm 21 is substantially a co-planar extension of the external surface of the fork leg 13 about the access opening 51 in the inactive position. As well it is preferred that the brake lever arm 21 by itself or together with its cover member 91 substantially fill the first access opening 51 as seen in side view from the outside.

In the embodiment in FIG. 8, as is also apparent in the embodiment of FIG. 26, the brake pad 23 extends rearwardly from the brake lever arm 21 rearwardly out of the first access opening 51.

Reference is made to FIGS. 26 to 31 which show an embodiment of the invention similar in many respects to the embodiment shown in FIGS. 5 to 8 however in which the cover plates 91, 92 of FIG. 8 are replaced by an single removable shroud 93 which closes the rear of each of the recesses 51, 52 in the fork legs and as well bridges between the fork legs over the fork crown 11 to close the cavity 97 at the rear of the crown 11 in which the straddle bridge 71 is received. With the shroud 93 secured in place the resultant exterior surfaces of the fork 9 and the shroud 93 forms an aerodynamic shape to assist in reducing drag when moved forwardly through air. While the shroud 93 is shown as a single unitary element, separate similar shrouds could be provided to separately cover each of the recesses 51, 52 in the fork legs, and/or the cavity 97 at the rear of the crown 11.

FIGS. 28, 29 and 30 are schematic cross sectional views through section lines A-A', B-B' and C-C' of FIG. 26 schematically showing merely the exterior surface of the fork 9. As seen in FIG. 28, the fork leg 14 has a tear drop shape in this horizontal cross section with an enlarged rounded forward portion 302 directed in the direction of forward movement of the bike. The exterior surface 301 tapers rearwardly to a reduced rounded rear portion 303.

FIG. 29 shows a cross sectional side view which extends through the widest portion of the protrusion 326 and shows the shroud 93 as providing a rear portion 307 of the protrusion 326. The front portion 308 of the protrusion is a rounded surface to assist in reducing drag.

FIG. 30 is a cross sectional view showing the exterior of the crown 11 also having a tear drop shape with an enlarged rounded front portion 309 and tapering to a reduced rounded rear portion 310.

As seen in FIG. 26, aside from the brake pads which extend inwardly from the insides of the fork legs 13, 14 and the protrusion 326, each fork leg has a tear drop shape cross section substantially throughout its height to assist in reducing drag.

The integrated fork with the rear mounted brake system of FIGS. 5 to 8 and 17 could be reversed with the recesses provided at the front of the fork 9 as opposed to the rear. Essentially the operation is the same except that the brake system would now be at the front of the fork 9.

The integrated fork with the rear mounted brake system of FIGS. 5 to 8 and 11 is provided on the front fork. A similar arrangement could be provided at an upper end of the seatstays 165 where the seatstays merge with a crown structure with the set tube or top tube, with preferably aerodynamic shapes adopted in the direction of forward movement of the bicycle.

The steerer tube 15 may be made of aluminum, steel or carbon fiber. The fork crown 11 may be made of aluminum, steel or carbon fiber and the fork legs 13, 14 may be made of carbon fiber.

The braking mechanisms shown in FIGS. 5 to 8 and 17 is a cantilever brake system where the pivot points to the brake arms are below the point at which the brakes are pulled. As shown it FIG. 7, the brake lever arms 21, 22 are pulled at the top when the straddle bridge 71 moves upward in the cavity 97 at the rear of the crown 11.

FIGS. 9 to 16 show different braking mechanisms that may be used within the integrated fork of FIGS. 1 to 8.

Figure 9:
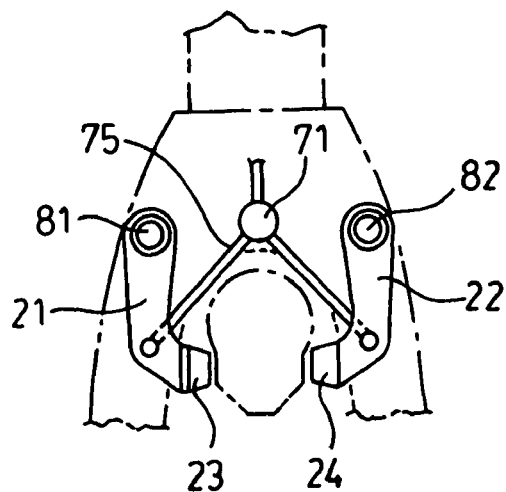
FIG. 9 skematically illustrates an elevation view of an Inverted Cantilever braking system.

FIG. 9 shows an inverted cantilever braking system wherein the pivot points 181, 182 are above the points of contact with the straddle cable 175.

Figure 10:
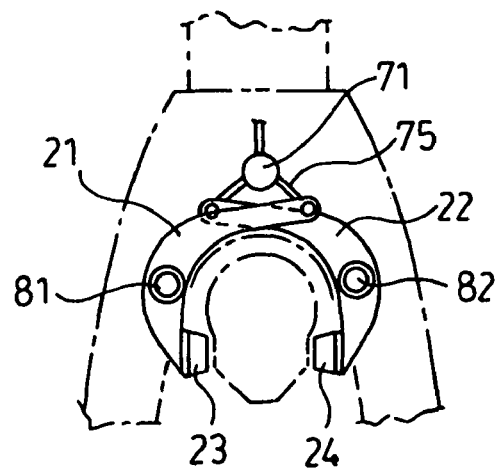
FIG. 10 skematically illustrates an elevation view of a Center-pull braking system.

FIG. 10 shows a center-pull brake system wherein each of the braking arms creates a scissor motion to cause the brake pads 223, 224 to move towards the wheel of the bicycle. When the straddle bridge 271 moves in the upward direction (when the brakes are being engaged) the top ends of the brake arms 221, 222 move together and cause the bottom ends to rotate around pivot points 281, 282 to bring the brake pads 223, 224 together.

Figure 11:
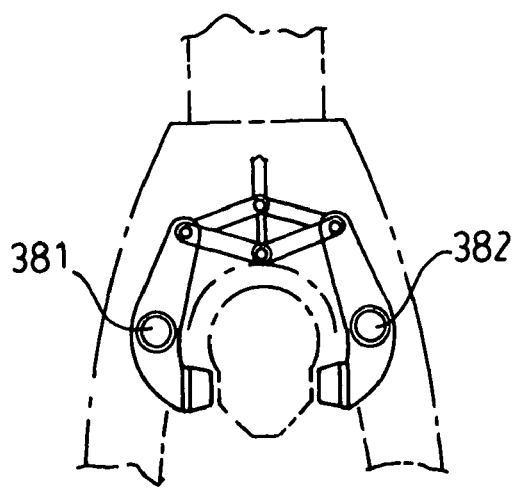
FIG. 11 skematically illustrates an elevation view of a Compound Linkage braking system.

FIG. 11 shows a compound linkage wherein the pivot points are above the brake engagement points. The compound linkage causes the part of the brake arms to move apart from each and causes brake arms to rotate and bring the brake pads together to engage the wheel of the bicycle.

Figure 12:
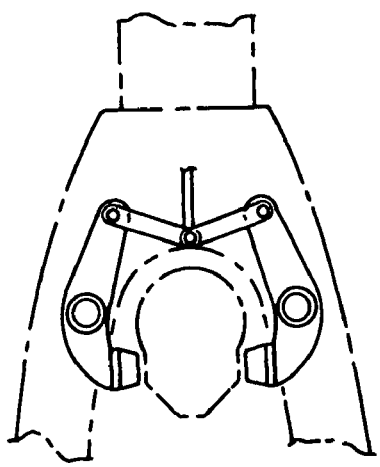
FIG. 12 skematically illustrates an elevation view of a Simplified Compound Linkage system.

FIG. 12 is a simplified compound linkage similar to the compound linkage shown in FIG. 11. Two of the links have been removed but the brake system works in the same fashion.

Figure 13:
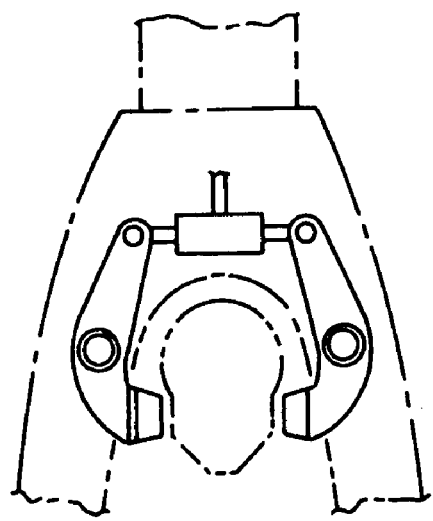
FIG. 13 skematically illustrates an elevation view of a Hydraulic Cylinder with Linkage braking system and a Ball Screw Actuator with linkage braking system.

FIG. 13 is a hydraulic cylinder with linkage wherein the hydraulic cylinder presses the upper parts of the break arms 521, 522 apart causing the break pads 523, 524 to move towards each other to engage the bicycle wheel. FIG. 13 is also an illustration of a Ball Screw Actuator which works the same as the hydraulic cylinder with linkage except that the hydraulic cylinder is replaced with a ball screw actuator.

Figure 14:
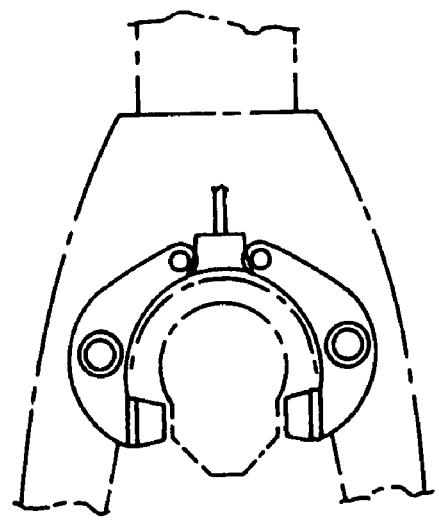
FIG. 14 skematically illustrates an elevation view of a Profiled Cam braking system.

FIG. 14 illustrates a profiled cam braking system. As shown in FIG. 14, when the cam is pulled an upper motion the top brake arms 621, 622 move away from each other according to the design to the cam. The cam is designed to become wider at the bottom to permit the top of the brake arms to move apart. The brake lever arms rotate about the pivot points 681, 682 to cause the brake pads 823, 824 to engage the bicycle wheel. The cam can be designed and adjusted to allow for the exact amount of pressure that the user may want to apply to the bicycle wheels.

Figure 15:
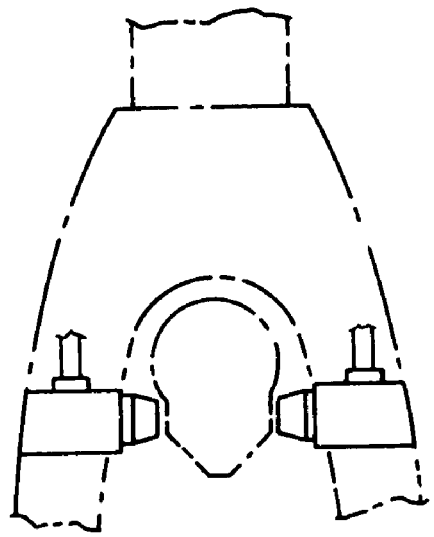
FIG. 15 skematically illustrates an elevation view of a Hydraulic Cylinder braking system.

FIG. 15 illustrates a hydraulic cylinder wherein the hydraulic cylinder presses the brake pads towards the wheel of the bicycle. The hydraulic cylinder does not require a pivot point.

Figure 16:
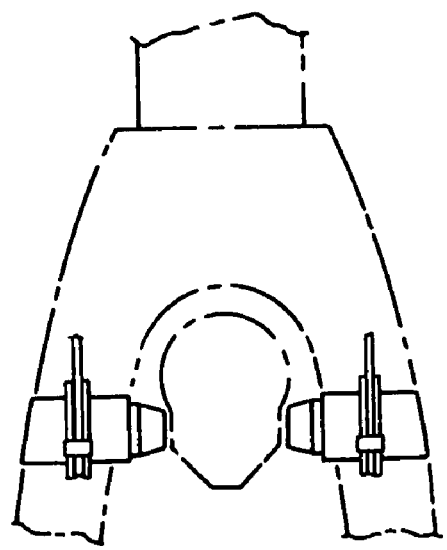
FIG. 16 skematically illustrates an elevation view of a Ball Screw braking system.

FIG. 16 illustrates a ball screw wherein the ball screw actuator is activated when the cable is pulled along with the cable pulley. The ball screw braking mechanism also does not need a pivot point in order to engage the braking system.

Figure 18:
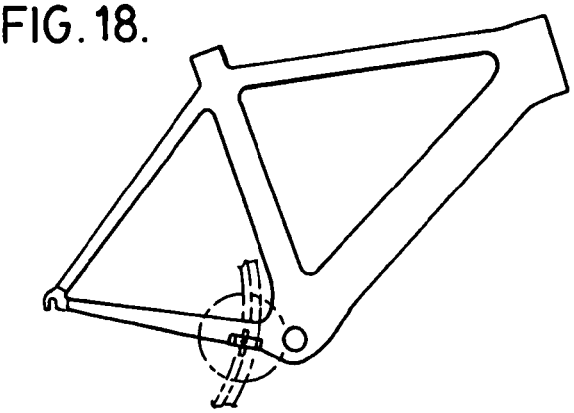
FIG. 18 is a side view of a bike frame showing the location of the braking system on the chain stays.
Figure 25:
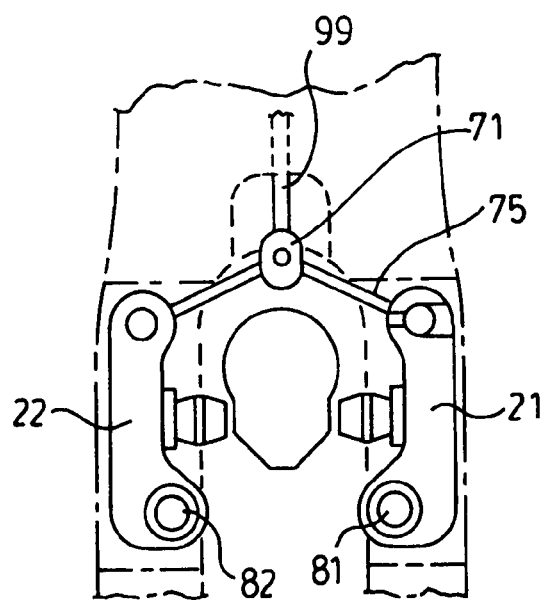
FIG. 25 skematically illustrates an elevation view of a Cantilever brake system similar to that shown in FIGS. 1 to 8 and 19 to 24.

FIG. 18 illustrates a bicycle frame showing the placement of a brake system similar to that shown in FIG. 25 on the chain stays of a bicycle frame. The brake system is located near the front of the chainstays where they are joined in a crown structure 11 adjacent the bottom of the chainstays.

Figure 19:
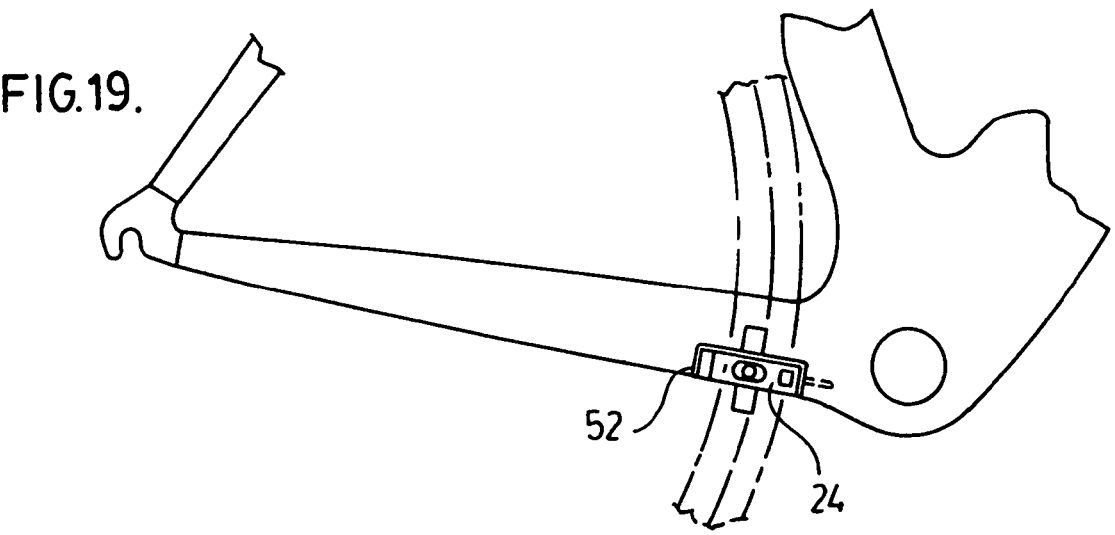
FIG. 19 is an enlarged view of portions of FIG. 18 illustrating the chain stays with a bottom mounted brake system.
Figure 20:
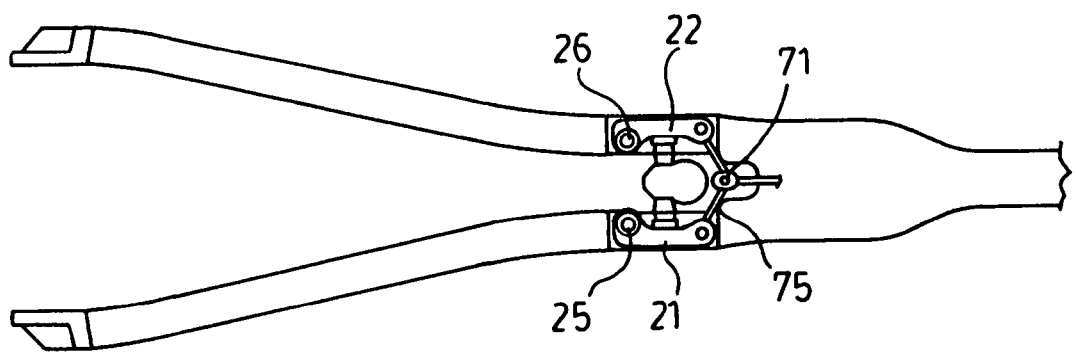
FIG. 20 is a bottom view of FIG. 19.

FIG. 19 is an enlarged view of FIG. 18 more clearly illustrating the location of the brake system on the integrated chain stays. FIGS. 19 and 20 illustrate a recess 31 in each arm of the chain stays open to the bottom and the inside in which the brake system 41 can sit. The brake system includes brake arms 21, 22, brake pad anchor screws 29 and 30 which attach the brake arms to the brake pads 23, 24.

FIG. 20 illustrates a bottom view of FIG. 19. The braking system illustrated is a Cantilever system similar to that described in FIGS. 5 to 8 wherein the straddle bridge 71 is attached to straddle cable 75 with ferrules 73 and 74 attached at the end of the straddle cable 75. When the brake handles (not shown) are squeezed, the brake cable 99 moves the straddle bridge 71 in a direction to the right causing the brake lever arms 21 and 22 to pivot around the pivot bolts 25 and 26 to permit the brake pads 23 and 24 to engage the wheel. The brake system fits within the structure of the chain stay so as to increase the aerodynamic design of the chain stays and reduce drag. In particular, the brake arms are contained within the structure of the chain stays and FIG. 20 shows that only the brake pads 23 and 24 are outside the structure of the chain stay. Again, this increases the aerodynamic design of the chain stay.

Figure 21:
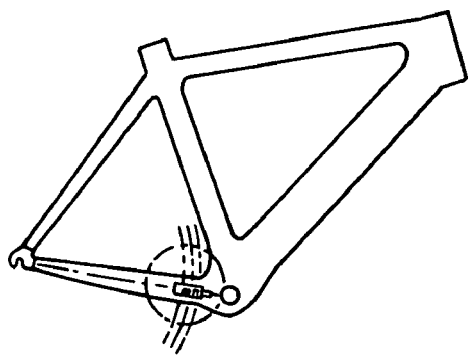
FIG. 21 is a side view of a bike frame showing the location of the brake system on the chain stays with a mid mounted brake system.
Figure 22:
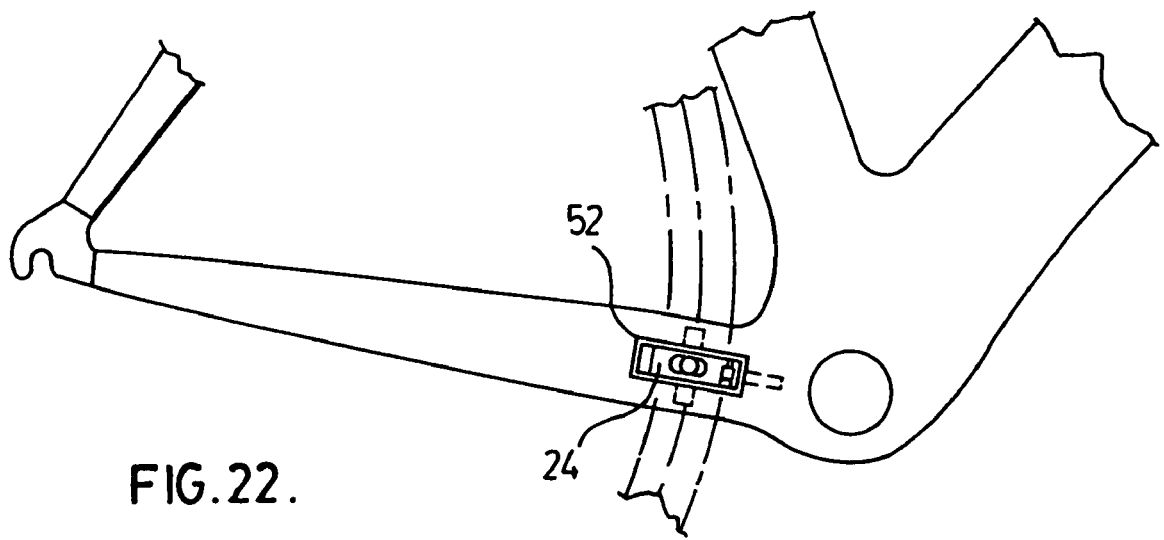
FIG. 22 illustrates an enlarged view of portions of FIG. 21.

FIGS. 21 and 22 illustrates a bicycle frame showing the placement of the brake system on the chainstays of a bicycle frame. The brake system is located near the front of the chainstays in the middle of the chainstays in recesses 31 laterally through each arm of the chainstays. The brake system similarly includes brake arms 21, 22, brake pad anchor screws 29 and 30 which attach the brake lever arms to the brake pads 23, 24.

FIGS. 21 and 22 illustrates a bicycle frame showing the placement of the brake system on the chainstays of a bicycle frame. The brake system is located near the front of the chainstays adjacent the top of the chainstays with a recess 31 in each arm of the chainstays open to the top and sides.

Figure 23:
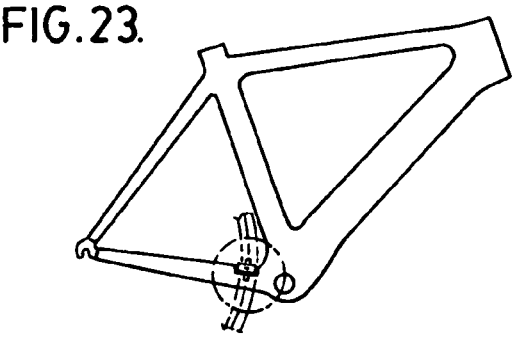
FIG. 23 is a side view of a bike frame showing the location of the brake system on the chain stays with a top mounted brake system.
Figure 24:
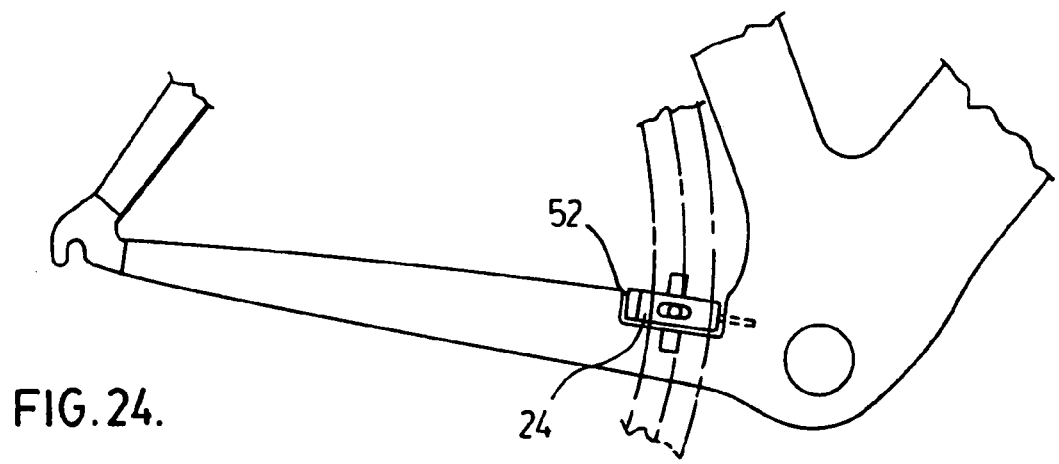
FIG. 24 is an enlarged view of portions of FIG. 23.

FIG. 23 illustrates a Cantilever braking system that can be used in any of the top, bottom or mid mounted braking systems in the integrated chainstays. As shown in FIG. 4, the straddle bridge 71 is attached to the brake cable and the straddle cable 75. The straddle cable 75 has barrels 73 and 74 attached to the end which fit into slots at the top end of the brake lever arms 21, 22. The straddle bridge 71 moves in an upward direction when the brake handles (not shown) are squeezed. This causes the top end of the brake lever arms 21, 22 to move together and rotate about the pivot point 81, 82 which are located at the centre of the pivot bolts 25, 26, respectively. As shown in FIG. 4, the brake pads 23 and 24 are located above the pivot bolts 25, 26 and therefore closer together in order to engage the bicycle wheel. Different braking mechanisms as disclosed in FIGS. 9 to 16 may also be used.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is understood that the invention is not restricted to these particular embodiments. Rather, the invention includes all embodiments, which are functional equivalents to the specific embodiments and features that have been described and illustrated herein.

The invention claimed is:
1. A bicycle comprising:
a frame;
a wheel-supporting structure comprising a crown section and a dual fork section, said dual fork section comprising first and second fork members attached to said crown section;
the wheel-supporting structure symmetrical about a central plane intermediate the first and second fork members,
a wheel rotatably attached to said fork members centered therebetween for rotating about a wheel axis normal the central plane; the wheel having a first side and a second side,
the bicycle is adapted for forward movement in a horizontal forward direction lying in the central plane,
a brake assembly carried on the wheel-supporting structure,
the brake assembly having a first and second lever arms,
the first fork member elongate about a first longitudinal,
the first fork member having an external surface which has in horizontal cross section a tear drop shape with an enlarged rounded forwardly directed front portion tapering to a reduced width rear portion,
a first access opening extending laterally through the first fork member providing access normal to the central plane from outside of the first fork member through the first fork member to the wheel,
the first access opening open through the rear portion extending inwardly from the rear portion of the first fork member to a rearwardly directed forward wall of the first access opening, the first access opening extending longitudionally of the first fork member from a downwardly directed upper wall to an upwardly directed lower wall,
a first brake axle member mounted to the first fork member in the first access opening in a cantilevered arrangement to the forward wall of the first access opening with an inboard end fixedly secured to the forward wall of the first access opening and the first brake axle member extending rearwardly about a first brake axis to an unsupported distal end; the first brake axis being normal to the wheel axis and parallel to the central plane,
the first lever arm pivotably mounted to the first brake axle member in the first access opening for pivoting about first brake axis,
the first lever arm carrying a first brake pad disposed to move toward the central plane to engage the first side of said wheel when said brake assembly is actuated,
the second fork member elongate about a second longitudional,
the second fork member having an external surface which has in horizontal cross section a tear drop shape with an enlarged rounded forwardly directed front portion tapering to a reduced width rear portion,
a second access opening extending laterally through the second fork member providing access normal to the central plane from outside of the second fork member through the second fork member to the wheel,
the second access opening open through the rear portion extending inwardly from the rear portion of the second fork member to a rearwardly directed forward wall of the second access opening, the second access opening extending longitudionally of the second fork member from a downwardly directed upper wall to an upwardly directed lower wall,
a second brake axle member mounted to the second fork member in the second access opening in a cantilevered arrangement to the forward wall of the second access opening with an inboard end fixedly secured to the forward wall of the second access opening and the second brake axle member extending rearwardly about a second brake axis to an unsupported distal end; the second brake axis being normal to the wheel axis and parallel to the central plane, the second lever arm pivotably mounted to the second brake axle member in the second access opening for pivoting about second brake axis, the second lever arm carrying a second brake pad disposed to move toward the central plane to engage the second side of said wheel when said brake assembly is actuated.

2. A bicycle as claimed in claim 1 wherein the wheel-supporting structure comprises a wheel-steering assembly attached to said frame for pivoting about a pivot axis lying in the central plane.

3. A bicycle as claimed in claim 2 wherein:
the first lever arm having an external surface facing away from the wheel,
the first fork member having an external surface facing away from the wheel, a first spring member biasing the first lever arm to pivot about the first brake axis moving the first brake pad away from the first side of the wheel to an inactive position of the first lever arm in which the external surface of the first lever arm is within the first access opening within a substantially co-planar extension of the external surface of the first fork member about the first access opening, the second lever arm having an external surface facing away from the wheel, the second fork member having an external surface facing away from the wheel, a second spring member biasing the second lever arm to pivot about the second brake axis moving the second brake pad away from the second side of the wheel to an inactive position of the second lever arm in which the external surface of the second lever arm is within the second access opening within a substantially co-planar extension of the external surface of the second fork member about the second access opening.

4. A bicycle as claimed in claim 3 further including:
a thin first cover plate removably secured to the first fork member to substantially close a laterally outward periphery of the first access opening, the first cover plate having an external surface which is co-planar extension of the external surface of the first fork member about the first access opening forming therewith a continuation of the tear drop shape of the first fork member, and
a thin second cover plate removably secured to the second fork member to substantially close a laterally outward periphery of the second access opening, the second cover member having an external surface which is co-planar extension of the external surface of the second fork member about the second access opening forming therewith a continuation of the tear drop shape of the second fork member.

5. A bicycle as claimed in claim 4 wherein in the inactive position
the external surface of the first lever arm lies closely inward of an internal surface of the first cover plate and
the external surface of the second lever arm lies closely inward of an internal surface of the second cover plate.

6. A bicycle as claimed in claim 3 wherein in the inactive position
the external surface of the first lever arm is a substantially co-planar extension of the external surface of the first fork member about the first access opening and
the external surface of the second lever arm is a substantially co-planar extension of the external surface of the second fork member about the secondaccess opening.

7. A bicycle as claimed in claim 6 wherein
the external surface of the first lever arm substantially filling the first access opening as seen in side view from the outside and
the external surface of the second lever arm substantially filling the second access opening as seen in side view from the outside.

8. A bicycle as claimed in claim 7 wherein
the first lever arm includes a first cover plate removably secured thereto providing the exterior surface of the first lever arm and
the second lever arm includes a second cover plate removably secured thereto providing the exterior surface of the second lever arm.

9. A bicycle as claimed in claim 1 wherein
the first brake pad extends forwardly from the first lever arm with at least a portion of the first brake pad forwardly from the first lever arm is disposed laterally between the first fork member and the first side of the wheel in a first pad recess opening rearwardly through the front wall of the first access opening and opening laterally toward the first side of the wheel, and
the second brake pad extends forwardly from the second lever arm with at least a portion of the second brake pad forwardly from the second lever arm is disposed laterally between the second fork member and the second side of the wheel in a second pad recess opening rearwardly through the front wall of the second access opening and opening laterally toward the second side of the wheel.

10. A bicycle as claimed in claim 1 wherein
the first brake pad extends rearwardly from the first lever arm rearwardly out of the first access opening, and
the second brake pad extends rearwardly from the second lever arm rearwardly out of the second access opening.

11. A bicycle as claimed in claim 1 wherein
the entirety of the first lever arm in the inactive position is substantially within the first access opening, and
the entirety of the second lever arm in the inactive position is substantially within the second access opening.

12. A bicycle as claimed in claim 1 wherein
a first brake axle socket extends through the forward wall of the first access opening forwardly from the first access opening, the first brake axle socket in part received within a first protrusion from the exterior surface of the first fork member on an inward side of the first fork member directed towards the wheel,
the first protrusion being generally semi-circular about the first brake axle socket and having a rounded forward end, and
a second brake axle socket extends through the forward wall of the second access opening forwardly from the second access opening, the second brake axle socket in part received within a second protrusion from the exterior surface of the second fork member on an inward side of the second fork member directed towards the wheel,
the second protrusion being generally semi-circular about the second brake axle socket and having a rounded forward end.

13. A bicycle as claimed in claim 12 wherein the first lever arm includes rearward of the semi-circular protrusion a first boss through which the first brake axle extends, the first boss substantially hidden as seen in front view by the first fork member and its semi-circular protrusion, and the second lever arm includes rearward of the semi-circular protrusion a second boss through which the second brake axle extends, the second boss substantially hidden as seen in front view by the second fork member and its semi-circular protrusion.

14. A bicycle comprising:
a frame;
a wheel-supporting structure comprising a crown section and a dual fork section, said dual fork section comprising first and second fork members attached to said crown section;

the wheel-supporting structure symmetrical about a central plane intermediate the first and second fork members, the first fork member elongate about a first longitudional;

the second fork member elongate about a second longitudional, a wheel rotatably attached to said fork members centered therebetween for rotating about a wheel axis normal the central plane; the wheel having a first side and a second side, a brake assembly carried on the wheel-supporting structure, the brake assembly having a first and second lever arms, the first lever arm pivotably mounted to the first fork member for pivoting about a first brake axis normal to the wheel axis, parallel to the central plane and generally normal to the longitudional of the first fork member;

a first brake axle member mounted in cantilevered arrangement to the first fork member with an inboard end fixedly secured to the first fork member extending about the first brake axis to an unsupported distal end;

the first lever arm carrying a first brake pad disposed to move toward the central plane to engage the first side of said wheel when said brake assembly is actuated;

the first lever arm having an external surface facing away from the wheel, the first fork member having an external surface facing away from the wheel, a first access opening laterally through the first fork member providing access normal to the central plane from outside of the first fork member through the external surface of the first fork to the exterior surface of the first brake lever, a first spring member biasing the first lever arm to pivot about the first brake axis moving the first brake pad away from the first side of the wheel to an inactive position of the first lever arm in which: (a) the external surface of the first lever arm forms a substantially co-planar extension of the external surface of the first fork about the first access opening, with (b) the external surface of the first lever substantially filling the first access opening;

the second lever arm pivotably mounted to the second fork member for pivoting about a second brake pivot normal to the wheel axis, the second lever arm pivotably mounted to the second fork member for pivoting about a second brake axis normal to the wheel axis, parallel to the central plane and generally normal to the longitudional of the second fork member;

a second brake axle member mounted in cantilevered arrangement to the second fork member with an inboard end fixedly secured to the second fork member extending about the second brake axis to an unsupported distal end;

the second lever arm carrying a second brake pad disposed to move toward the central plane to engage the second side of said wheel when said brake assembly is actuated;

the second lever arm having an external surface facing away from the wheel, the second fork member having an external surface facing away from the wheel, a second access opening laterally through the second fork member providing access normal to the central plane from outside of the second fork member through the external surface of the second fork member to the exterior surface of the second brake lever, a second spring member biasing the second lever arm to pivot about the second brake axis moving the second brake pad away from the second side of the wheel to an inactive position of the second lever arm in which: (a) the external surface of the second lever arm forms a substantially co-planar extension of the external surface of the second fork member about the second access opening, with (b) the external surface of the second lever substantially filling the second access opening;

a mechanism for actuating said brake assembly.

15. A bicycle as claimed in claim 14 wherein the wheel-supporting structure comprises a wheel-steering assembly attached to said frame for pivoting about a pivot axis lying in the central plane.

16. A bicycle as claimed in claim 14 wherein the first lever arm includes a first cover plate removably secured thereto providing the exterior surface of the first lever arm, and the second lever arm includes a second cover plate removably secured thereto providing the exterior surface of the second lever arm.

17. A bicycle as claimed in claim 14 wherein the bicycle is adapted for forward movement in a forward direction lying in the central plane, the first brake axle member having its inboard end forward of its distal end with the first brake axle member extending rearwardly from the first fork member, the second brake axle member having its inboard end forward of its distal end with the second brake axle member extending rearwardly from the second fork member.

18. A bicycle as claimed in claim 14 wherein the exterior surface of the first fork member in cross-section normal to the first longitudinal axis forms a tear drop shape with an enlarged rounded end of the tear drop shape directed forwardly.

19. A bicycle as claimed in claim 1 wherein at least a portion of the first brake pad is disposed between the first fork member and the first side of the wheel, and at least a portion of the second brake pad is disposed between the second fork member and the second side of the wheel.

* * * * *